US012370120B2

(12) United States Patent
Fateh

(10) Patent No.: US 12,370,120 B2
(45) Date of Patent: Jul. 29, 2025

(54) METHOD AND APPARATUS FOR DIAGNOSTIC SUPPORT AND MANAGEMENT OF EYE HEALTH

(71) Applicant: Sina Fateh, Sunnyvale, CA (US)

(72) Inventor: Sina Fateh, Sunnyvale, CA (US)

( * ) Notice: Subject to any disclaimer, the term of this patent is extended or adjusted under 35 U.S.C. 154(b) by 0 days.

(21) Appl. No.: 18/531,224

(22) Filed: Dec. 6, 2023

(65) Prior Publication Data

US 2025/0032346 A1 Jan. 30, 2025

Related U.S. Application Data

(60) Provisional application No. 63/528,868, filed on Jul. 25, 2023.

(51) Int. Cl.
*A61B 3/02* (2006.01)
*A61B 3/024* (2006.01)
(Continued)

(52) U.S. Cl.
CPC ............... *A61H 5/00* (2013.01); *G06F 3/013* (2013.01); *G06T 7/70* (2017.01);
(Continued)

(58) Field of Classification Search
CPC .. A61B 3/02; A61B 3/102; A61B 3/00; A61B 3/113; A61B 3/1015; A61B 3/103; A61B 3/1225; A61B 3/024; G06T 19/006; G06T 7/004; G02F 3/013; G02F 3/0485; G02F 1/163; G02F 3/011; G02F 3/017;
(Continued)

(56) References Cited

U.S. PATENT DOCUMENTS 8,675,153 B2    3/2014  Bruyneel et al.
2009/0180071 A1*  7/2009  Fateh ..................... A61B 3/032
                                                       351/203
(Continued)

FOREIGN PATENT DOCUMENTS

GB          2477787 A  *  8/2011  ........... H04N 13/007
WO    WO-2020219518 A1 * 10/2020  ............... A61B 3/04

*Primary Examiner* — Dawayne Pinkney
(74) *Attorney, Agent, or Firm* — INNOVATION CAPITAL LAW GROUP, LLP; Vic Lin

(57) ABSTRACT

A display emphasis differential between first and second display regions may be applied. First and second visual regions then receive a visual emphasis differential; alternately, a selective digital image filter is provided acting on specific areas of visual content representing different areas of the retina. Visual emphasis differentials can physiologically bias against progressive myopia. Also, a subject focuses central vision at distance, views first and second targets with peripheral vision, and adjusts distance until their vision fuses a third target. Practicing can physiologically bias against progressive myopia. Further, breaks having adaptive intervals and durations while interrupting graphical output physiologically biases against progressive myopia. Content delivery continues with audio text descriptions in place of graphical output. Also, a large learning model database and generative decision support artificial intelligence cooperate to process large, multi-dimensional data sets informing decision support for choices and parameters regarding diagnosis and treatment of progressive myopia.

22 Claims, 15 Drawing Sheets

(51) Int. Cl.
*A61B 3/10* (2006.01)
*A61B 3/12* (2006.01)
*A61H 5/00* (2006.01)
*G06F 3/01* (2006.01)
*G06T 7/70* (2017.01)

(52) U.S. Cl.
CPC ............... *A61H 2201/5007* (2013.01); *A61H 2201/5043* (2013.01); *G06T 2207/30201* (2013.01)

(58) Field of Classification Search
CPC .......... G02F 17/30058; H04N 13/0477; G02B 27/0093; G02B 27/017; G02B 2027/0187; G02B 2027/0141; G02B 2027/0198
USPC ........ 351/205, 200, 203, 209–211, 221–224, 351/239, 243, 246
See application file for complete search history.

(56) References Cited

U.S. PATENT DOCUMENTS

| | | | |
|---|---|---|---|
| 2016/0133170 A1* | 5/2016 | Fateh | G06F 3/04817 345/428 |
| 2017/0293356 A1* | 10/2017 | Khaderi | G02B 27/0172 |
| 2019/0041669 A1* | 2/2019 | Jiang | G02B 27/017 |
| 2021/0201847 A1* | 7/2021 | Fateh | G06F 3/012 |
| 2021/0356767 A1* | 11/2021 | Kubota | B29D 11/00317 |
| 2024/0037715 A1* | 2/2024 | Thompson | G06T 5/70 |

* cited by examiner

METHOD AND APPARATUS FOR DIAGNOSTIC SUPPORT AND MANAGEMENT OF EYE HEALTH

CROSS REFERENCE TO RELATED APPLICATIONS

This application claims the benefit of priority to U.S. provisional patent application No. 63/528,868, filed Jul. 25, 2023, the contents of which are herein incorporated by reference.

FIELD OF THE INVENTION

Various embodiments concern treatments for addressing myopia and diagnostic support related thereto. More particularly, various embodiments relate to non-pharmaceutical approaches for reducing, halting, and/or reversing the progression of myopia, and to artificial intelligence based decision support tools for informing and/or evaluating such approaches.

BACKGROUND

Stresses of various sorts in or on the eyes may be associated with certain medical conditions, and/or resultant symptoms of those conditions. For example, certain forms of myopia may be caused or at least aggravated by the use of visual displays such as those found on smart phones, laptop, and desktop computers. For example, a smart phone display may typically present bright, high contrast content to a viewer's central vision at a relatively short focal distance (e.g., significantly less than an arm's length), while some or all of the viewer's peripheral vision does not receive content from the display and instead receives visual input from the surrounding environment which may be dark, low contrast, and/or at a longer focal distance. Such differences between what is received by the eye's central and peripheral vision may be interpreted by the body as a dysfunction of the eye, prompting neural adaptation (such as changes in the way the optic nerve and/or brain process information) and/or physical adaptation (such as changes in the shape of the retina and/or the eye as a whole).

Pharmaceutical approaches may provide some useful results in at least certain cases. For example, atropine eye drops may be useful in counteracting certain forms of myopia to at least some degree. However, the mechanism by which atropine accomplishes such a function is not well understood, making it difficult to determine a suitable dose for a given patient, to identify contraindications, etc. In addition, while occasional use (e.g., for medical exams) has a long history and appears to be at least largely safe from a medical standpoint, the side effects, development of tolerance, potential for damage, etc. of long term, regular use remain unclear.

Furthermore, the structure and function of the human eye are extremely complicated and highly variable, with significant differences from group to group and even individual to individual, multiple biological processes that may interact in complex ways, etc.; consequently the precise stimuli as may lead to myopia (or other conditions) may be difficult to predict with a simple, generalized model. For example, a broad approach to decrease screen brightness to avoid changes leading to myopia may be effective for certain individuals, but may not necessarily be effective (and indeed may even be counterproductive) for other individuals. Thus, simple "one size fits all" behavioral approaches may not be widely effective, and may even be at least potentially harmful. Identifying appropriate treatments for a specific patient (whether such treatments are behavioral, pharmaceutical, some combination thereof, or otherwise) may be particularly difficult due to the large number of factors as may potentially affect how that specific patient responds to any given treatment. Any or all of age, ethnicity, family history, local environment, gender, current level of myopia (if any), amount of time spent outside, typical solar intensity (e.g., based on geography and climate), amount and type of screen time, etc. may be relevant in determining what specific approaches may be useful, what approaches may not be useful, and/or what approaches may be harmful for that patient. Thus a decision matrix for diagnosis and evaluation may be exceedingly complex, with potentially dozens (or more) of potentially relevant factors. Making effective decisions on such matters unaided may be difficult even for highly trained medical professionals.

BRIEF SUMMARY OF THE INVENTION

This disclosure contemplates a variety of systems, apparatus, methods, and paradigms for addressing eye health concerns including but not limited to a progression of myopia, and for informing diagnosis, prescription, and evaluation related to such.

In one embodiment, a method is provided that includes delivering a central visual field for an eye of a user, delivering a peripheral visual field for the eye, establishing a first visual region for the eye, the first visual region including at least a portion of the central visual region, and establishing a second visual region for the eye, the second visual region including at least a portion of the peripheral visual region. The method includes establishing a visual emphasis differential between the first and second visual regions.

The method also includes establishing a first display region for a display, the first display region corresponding with the first visual region so as to deliver a first display content from the first display region to the first visual region, and establishing a second display region for the display, the second display region corresponding with the second visual region so as to deliver a second display content from the second display region to the second visual region. The method includes establishing a display emphasis differential between the first and second display regions so as to yield the visual emphasis differential between the first and second visual regions.

The method includes applying the display emphasis differential via the display to the first display content in the first display region and to the second display content in the second display region, and maintaining over time the correspondence of the first and second display regions with the first and second visual regions so as to maintain the visual emphasis differential between the first and second visual regions, such that the visual emphasis differential biases the eye towards a therapeutic outcome.

The method may include carrying out steps in a processor with executable instructions disposed therein, the steps including one or more of: determining the central visual field, determining the peripheral visual field, establishing the first visual region, establishing the second visual region for the eye, establishing the visual emphasis differential, establishing the first display region, establishing the second display region, establishing the display emphasis differential, applying the display emphasis differential, and maintaining the correspondence.

In the method, the processor may be disposed within an electronic device such as a smart phone display, a laptop computer display, a computer monitor display, a television display and a head mounted display.

The method may include using an artificial intelligence decision support tool in carrying out one or more of determining the central visual field, determining the peripheral visual field, establishing the first visual region, establishing the second visual region for the eye, establishing the visual emphasis differential, establishing the first display region, establishing the second display region, establishing the display emphasis differential, applying the display emphasis differential, and maintaining the correspondence.

In the method, biasing the eye towards a therapeutic outcome may include biasing the eye against myopia.

In the method, the display emphasis differential may include one or more of: altering at least one first image property in at least a portion of the first display region and altering at least one second image property in at least a portion of the second display region.

In the method, the display emphasis differential may include one or more of: enhancing at least one first image property in at least a portion of the first display region, degrading the at least one first image property in at least the portion of the first display region enhancing the at least one first image property in at least a portion of the second display region, and degrading the at least one first image property in at least the portion of the second display region.

In the method, the first and/or second image property may include one or more of: brightness, contrast, saturation, resolution, tint, display refresh rate, video frame rate, animation speed, focus, sharpness, and diffusion.

In the method, one or both of the first image property and second image property may be like image properties. In the method, one or both of the first image property and second image property may be unlike image properties.

The method may include varying over time one or more of: the first visual region with respect to the central visual field and/or the peripheral visual field, the second visual region with respect to the central visual field and/or the peripheral visual field, and the visual emphasis differential.

The method may include varying over time one or more of: the shape of the first visual region, the size of the first visual region, and/or the position of the first visual region, the shape of the second visual region, the size of the second visual region, and/or the position of the second visual region, and one or more image properties of the visual emphasis differential including one or more of: brightness, contrast, saturation, resolution, tint, display refresh rate, video frame rate, animation speed, focus, sharpness, and diffusion.

The method may include varying over time one or more of: the first display region, the second display region, and the display emphasis differential.

The method may include varying over time at least one of: the shape of the first display region, the size of the first display region, and/or the position of the first display region, the shape of the second display region, the size of the second display region, and/or a position of the second display region, and one or more image properties of the display emphasis differential including one or more of: brightness, contrast, saturation, resolution, tint, display refresh rate, video frame rate, animation speed, focus, sharpness, and diffusion.

In the method, maintaining the correspondence of the first and second display regions with the first and second visual regions may include eye tracking.

In the method, first visual region may include from 0 to 5 degrees from a visual center, and the second visual region may include from 5 to 15 degrees from the visual center.

In the method, the first visual region may be one or more of: a circle, a circular segment, a truncated circular segment, a rectangle, and a square. In the method, the second visual region may be one or more of: a circle, a circular segment, a truncated circular segment, a rectangle, and a square. In the method, the first visual region and the second visual region may not be contiguous. In the method, each of the first visual region and/or the second visual region may include two or more subregions that are not mutually contiguous.

In another embodiment, a method is provided that includes determining a left central visual field for a left eye of a user and a right central visual field for a right eye of the user, determining a left peripheral visual field for the left eye and a right peripheral visual field for the right eye, establishing a left first visual region for the left eye including at least a portion of the left first central visual region, establishing a left second visual region for the left eye including at least a portion of the left first peripheral visual region, establishing a right first visual region for the right eye including at least a portion of the right central visual region, establishing a right second visual region for the right eye including at least a portion of the right peripheral visual region.

The method includes establishing a left visual emphasis differential between the left first and second visual regions, and establishing a right visual emphasis differential between the right first and second visual regions.

The method includes establishing a first display region for a display corresponding with the left first visual region and the right first visual region so as to deliver a first display content from the first display region to the left first visual region and the right first visual region, and establishing a second display region for the display, the second display region corresponding with the left second visual region and the right second visual region so as to deliver a second display content from the second display region to the left second visual region and the right second visual region.

The method includes establishing a display emphasis differential between the first and second display regions so as to yield the left visual emphasis differential between the left first and second visual regions and to yield the right visual emphasis differential between the right first and second visual regions, applying the display emphasis differential via the display to the first display content in the first display region and to the second display content in the second display region, and maintaining over time the correspondence of the first and second display regions with the left first and second visual regions and the right first and second visual regions so as to maintain the left visual emphasis differential between the left first and second visual regions and the right visual emphasis differential between the right first and second visual regions, such that the left and right visual emphasis differentials bias the left and right eyes towards therapeutic outcome.

In another embodiment, a method is provided that includes determining a left central visual field for a left eye of a user and a right central visual field for a right eye of the user, and determining a left peripheral visual field for the left eye and a right peripheral visual field for the right eye. The method includes establishing a left first visual region for the left eye including at least a portion of the left first central visual region, establishing a left second visual region for the left eye including at least a portion of the left first peripheral visual region, establishing a right first visual region for the right eye including at least a portion of the right central visual region, and establishing a right second visual region for the right eye including at least a portion of the right peripheral visual region.

The method includes establishing a left visual emphasis differential between the left first and second visual regions, and establishing a right visual emphasis differential between the right first and second visual regions.

The method includes establishing a left first display region for a left display corresponding with the left first visual region so as to deliver a left first display content from the left first display region to the left first visual region, establishing a left second display region for the left display corresponding with the left second visual region so as to deliver a left second display content from the left second display region to the left second visual region, establishing a right first display region for a right display corresponding with the right first visual region so as to deliver a right first display content from the right first display region to the right first visual region, and establishing a right second display region for the right display corresponding with the right second visual region so as to deliver a right second display content from the right second display region to the right second visual region.

The method includes establishing a left display emphasis differential between the left first and second display regions so as to yield the left visual emphasis differential between the left first and second visual regions, and establishing a right display emphasis differential between the right first and second display regions so as to yield the right visual emphasis differential between the right first and second visual regions.

The method includes applying the left display emphasis differential via the left display to the left first display content in the left first display region and to the left second display content in the left second display region, applying the right display emphasis differential via the right display to the right first display content in the right first display region and to the right second display content in the right second display region, maintaining over time the correspondence of the left first and second display regions with the left first and second visual regions so as to maintain the left visual emphasis differential between the left first and second visual regions, and maintaining over time the correspondence of the right first and second display regions with the right first and second visual regions so as to maintain the right visual emphasis differential between the right first and second visual regions, such that the left visual emphasis differential biases the left eye towards a left therapeutic outcome and the right visual emphasis differential biases the right eye towards a right therapeutic outcome.

In another embodiment, an apparatus is provided that includes a display, a visual field monitor, and a processor. The processor includes executable instructions instantiated thereon for determining a central visual field for an eye of a user in cooperation with the visual field monitor, determining a peripheral visual field for the eye in cooperation with the visual field monitor, establishing a first visual region for the eye, the first visual region including at least a portion of the central visual region, and establishing a second visual region for the eye, the second visual region including at least a portion of the peripheral visual region.

In the apparatus, the processor includes executable instructions instantiated thereon for establishing a visual emphasis differential between the first and second visual regions.

In the apparatus, the processor includes executable instructions instantiated thereon for establishing a first display region for a display corresponding with the first visual region so as to deliver a first display content from the first display region to the first visual region, and establishing a second display region for the display corresponding with the second visual region so as to deliver a second display content from the second display region to the second visual region.

In the apparatus, the processor includes executable instructions instantiated thereon for establishing a display emphasis differential between the first and second display regions so as to yield the visual emphasis differential between the first and second visual regions, applying the display emphasis differential via the display to the first display content in the first display region and to the second display content in the second display region, and updating the display so as to maintain over time the correspondence of the first and second display regions with the first and second visual regions so as to maintain the visual emphasis differential between the first and second visual regions, such that the visual emphasis differential biases the eye towards a therapeutic outcome.

In the apparatus, the visual field monitor may include a camera adapted to track the eye of the user.

In the apparatus, the display may include one or more of: a smart phone display a laptop computer display a computer monitor display a television display, and a head mounted display. In the apparatus, the display may include one or more of a mono display and a stereo display.

In another embodiment, an apparatus is provided that includes means for displaying visual content, and means for monitoring a visual field of an eye of a user. The apparatus includes means for processing executable instructions adapted to determine a central visual field for an eye of a user in cooperation with the visual field monitor, determine a peripheral visual field for the eye in cooperation with the visual field monitor, establish a first visual region for the eye, the first visual region including at least a portion of the central visual region, and establish a second visual region for the eye, the second visual region including at least a portion of the peripheral visual region.

The apparatus includes means for processing executable instructions adapted to establish a visual emphasis differential between the first and second visual regions.

The apparatus includes means for processing executable instructions adapted to establish a first display region for a display corresponding with the first visual region so as to deliver a first display content from the first display region to the first visual region, and establish a second display region for the display corresponding with the second visual region so as to deliver a second display content from the second display region to the second visual region.

The apparatus includes means for processing executable instructions adapted to establish a display emphasis differential between the first and second display regions so as to yield the visual emphasis differential between the first and second visual regions, apply the display emphasis differential via the display to the first display content in the first display region and to the second display content in the second display region, and update the display so as to maintain over time the correspondence of the first and second display regions with the first and second visual regions so as to maintain the visual emphasis differential between the first and second visual regions, such that the visual emphasis differential biases the eye towards a therapeutic outcome.

In another embodiment, a method is provided that includes advising a subject to dispose a display such that an outer edge of the display is near the subject's central vision, advising the subject to focus beyond the outer edge of the display, and presenting on the display at least a first visual target and a second visual target, proximate the outer edge, with a separation between the first and second visual targets. The method includes advising the subject to maintain the first and second visual targets in a peripheral vision of the subject and to adjust a range from the eyes to the display until a third visual target including a fusion of the first and second visual targets becomes visible in the peripheral vision. The method includes altering the first and second visual targets on the display and advising the subject to maintain the third visual target, such that the visual accommodation for the subject's eyes relaxes, and/or the subject's pupils dilate, so as to bias the eyes away from myopia.

In the method, altering the first and second visual targets may include one or more of: the horizontal separation of the first and second visual targets, the vertical position of one or more of the first and second visual targets, the orientation of one or more of the first and second visual targets, the color of one or more of the first and second visual targets, the brightness of one or more of the first and second visual targets, the contrast of one or more of the first and second visual targets, the saturation of one or more of the first and second visual targets, the tint of one or more of the first and second visual targets, the motion of one or more of the first and second visual targets, the animation of one or more of the first and second visual targets, the color of a background of the first and second visual targets, the brightness of the background of the first and second visual targets, the contrast of the background of the first and second visual targets, the saturation of the background of the first and second visual targets, and the tint of the background of the first and second visual targets.

The method may include advising the subject to clarify the focus of the third visual target in the subject's peripheral vision.

In the method, the display may include one or more of: a smart phone display, a laptop computer display, a computer monitor display, a television display, and a head mounted display.

The method may include carrying out executable instructions in a processor to perform at least one of: advising the subject to dispose the display, advising the subject to focus beyond the outer edge of the display, presenting the first and second visual targets on the display, advising the subject to maintain the first and second visual targets in the peripheral vision, advising the subject to adjust the range, altering on the display the first and second visual targets, and advising the subject to maintain the third visual target.

In the method, the processor may be disposed within an electronic device such as a smart phone, a laptop computer, a computer monitor, a television, and a head mounted display.

In another embodiment, a method is provided that includes establishing a central vision of a subject and a peripheral vision of the subject, presenting on a transparent display at least a first visual target and a second visual target in the peripheral vision but vertically near the central vision, with a horizontal separation between the first and second visual targets. The method includes altering on the transparent display the visual distance to the first and second visual targets, and advising the subject to maintain the first and second visual targets in their peripheral vision until a third visual target including a fusion of the first and second visual targets becomes visible in the peripheral vision.

The method includes altering on the transparent display the first and second visual targets, and advising the subject to maintain the third visual target, such that visual accommodations for the subject's eyes relax and/or the pupils of the eyes of the subject dilate, so as to bias the eyes away from myopia.

In another embodiment, a method is provided that includes a subject disposing a display such that an outer edge of the display is vertically near the central vision of the subject's eyes, and the subject focusing beyond the outer edge of the display. The method includes presenting on the display at least a first visual target and a second visual target, vertically near the outer edge, with a horizontal separation between the first and second visual targets.

The method includes the subject maintaining the first and second visual targets in a peripheral vision of the subject, and adjusting a range from the eyes to the display until a third visual target including a fusion of the first and second visual targets becomes visible in the peripheral vision, and altering on the display the first and second visual targets with the subject to maintaining the third visual target, such that visual accommodation for the subject's eyes relax and/or the subject's pupils dilate so as to bias the eyes away from myopia.

In another embodiment, an apparatus is provided that includes a display; an adviser, and a processor. The processor includes executable instructions instantiated thereon adapted to advise a subject to dispose the display such that an outer edge of the display is near the central vision of the subject's eyes, advise the subject to focus beyond the outer edge of the display and present on the display at least a first visual target and a second visual target, near the outer edge, with a separation between the first and second visual targets. The processor includes executable instructions adapted to advise the subject to maintain the first and second visual targets in a peripheral vision of the subject, and to adjust a range from the eyes to the display until a third visual target including a fusion of the first and second visual targets becomes visible in the peripheral vision, alter on the display the first and second visual targets, and advise the subject to maintain the third visual target, such that the visual accommodation for the subject's eyes relaxes, and/or the pupils of the subject's eyes dilate, so as to bias the eyes away from myopia.

In another embodiment, a method is provided that includes establishing a break interval for a subject viewing a display, and establishing a break duration for the subject viewing the display. The method includes advising the viewer to interrupt viewing the display responsive to completion of the break interval, and advising the viewer that viewing the display may resume responsive to completion of the break duration.

The method includes executing executable instructions in a processor to carry out at least one of: establishing the break interval, establishing the break duration, advising the viewer to interrupt viewing the display, and advising the viewer that viewing the display may resume.

The method may include disabling the display further responsive to completion of the break interval, and enabling the display further responsive to completion of the break duration.

The method may include initiating presenting audio description of an ongoing visual content for the display further responsive to completion of the break interval, and terminating presenting audio description of the ongoing visual content for the display further responsive to completion of the break duration. The method may include generating the audio description using AI interpretation of the ongoing visual content.

The method may include initiating presenting audio unrelated to a visual content of the display further responsive to completion of the break interval, and terminating presenting audio unrelated to a visual content of the display further responsive to completion of the break duration.

The method may include advising the user to terminate using a personal optical device further responsive to completion of the break interval, and advising the viewer that using the personal optical device may resume further responsive to completion of the break duration. In the method, the personal optical device may include at least one corrective lens In the method, one or more of the break interval and the break duration may be determined as a set time period. In the method, one or more of the break interval and the break duration may be determined as a variable time period. In the method, one or more of the break interval and the break duration may be determined based one or more of: one or more medical factor of the viewer, one or more behavioral factor of the viewer, one or more environmental factor proximate the viewer, and the prior content presented by the display. In the method, one or more of the break interval and the break duration may be determined with use of an artificial intelligence decision support tool.

In another embodiment, an apparatus is provided that includes a display, an adviser, and a processor. The processor includes executable instructions thereon for establishing a break interval for a viewer viewing the display, establishing a break duration for the viewer viewing the display, advising the viewer to interrupt viewing the display responsive to completion of the break interval, and advising the viewer that viewing the display may resume responsive to completion of the break duration.

In another embodiment, a method is provided that includes, in a processor, configuring executable instructions to establish a large learning model artificial intelligence engine, the engine being adapted for intaking and integrating a plurality of health related considerations, so as to provide decision support output including notable patterns therein and potential relevant, significant, and actionable therapeutic interventions therefrom. The method includes, in a processor, populating the engine with a large learning model database directed to a health condition, engaging the engine with ongoing data input paths for the database, and training the engine for the intaking and integrating so as to validate the decision support output. The method includes applying the engine to at least one individual patient so as to generate individual decision support output therefor, and communicating the individual decision support externally from the engine so as to facilitate a therapeutic intervention for the individual patient.

In the method, the engine, the database, the training, the individual decision support, and/or the therapeutic intervention may address the individual patient's myopia.

In the method, the considerations may include a plurality of factors, factor weights, and/or effects, and/or interactions thereamong.

In the method, the considerations may include one or more of: the age of the individual, the heredity of the individual, the ethnicity of the individual, one or more known ocular medical issues of the individual, one or more known non-ocular medical issues of the individual, the daily indoor time of the individual, one or more indoor environmental conditions proximate the individual, one or more typical indoor activities of the individual, one or more indoor non-display close vision activities of the individual, the daily total screen time of the individual, the daily smart phone time of the individual, the daily laptop time of the individual, the daily desktop time of the individual, the daily television time of the individual, one or more screen viewing activities of the individual, one or more screen viewing content types of the individual, the daily outdoor times of the individual, one or more outdoor environmental conditions proximate the individual, the daylight intensity proximate the individual, the UV level proximate the individual, the smoke level proximate the individual, one or more non-smoke pollutant levels proximate the individual, the daily sleep time of the individual, one or more sleep environmental conditions proximate the individual, and the geographical location of the individual.

The method may include applying the engine to a plurality of individual patients so as to generate a plurality of individual decision support outputs therefor, and communicating the plurality of individual decision supports externally from the engine so as to facilitate a plurality of therapeutic interventions for the plurality of individual patients. The method may include applying the engine to a plurality of individual patients so as to generate a collective individual decision support output therefor, and communicating the collective individual decision support externally from the engine so as to facilitate a collective therapeutic intervention for the plurality of individual patients.

BRIEF DESCRIPTION OF THE SEVERAL
VIEWS OF THE DRAWINGS

Various objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

Figure 1:
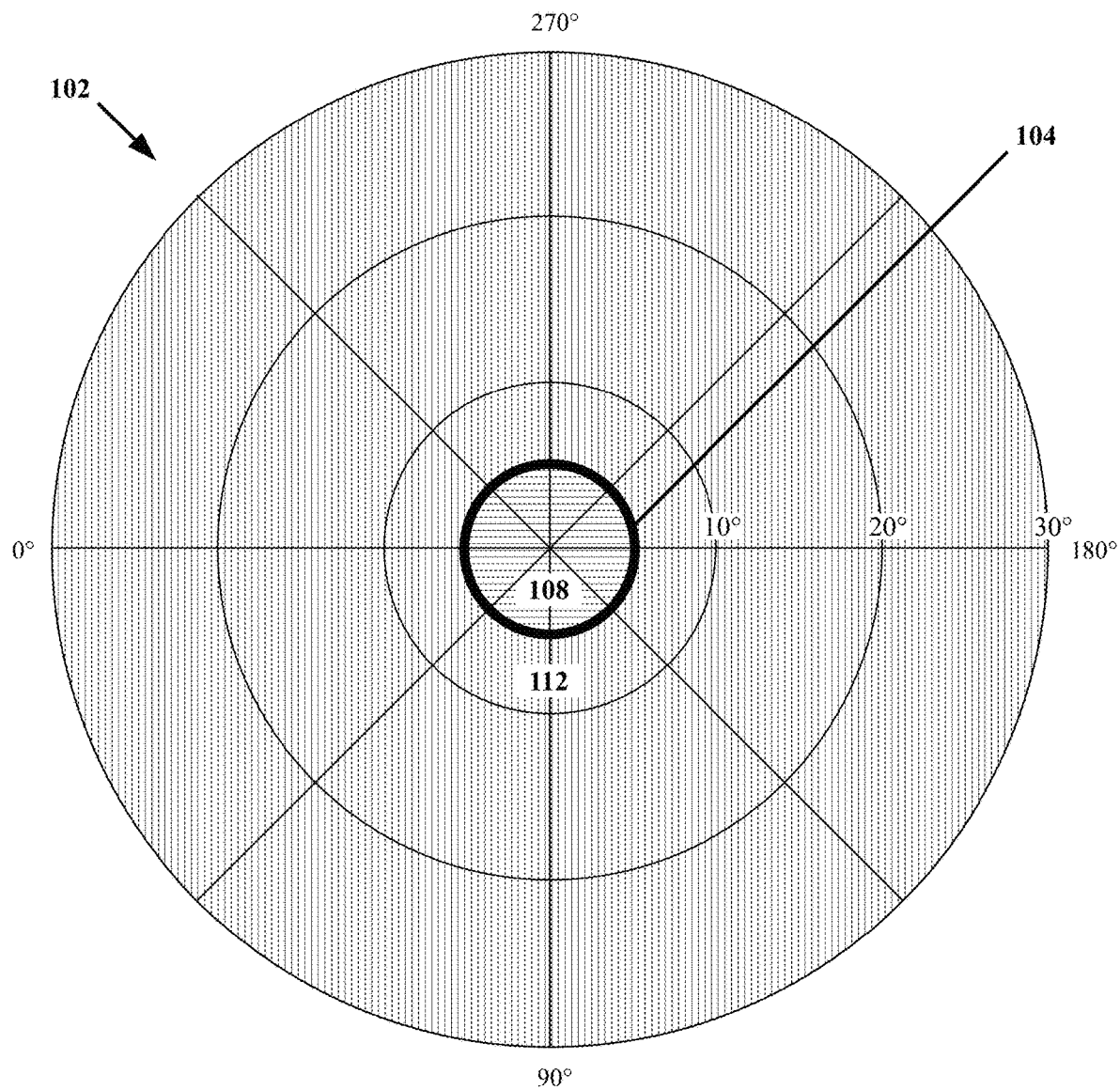
FIG. 1 shows an example illustration of a visual field of an eye, in geometric representation, with central and peripheral fields indicated.

The figures depict various embodiments described throughout the Detailed Description for the purposes of illustration only. While specific embodiments have been shown by way of example in the drawings and are described in detail below, the technology is amenable to various modifications and alternative forms. The intention is not to limit the technology to the particular embodiments described. Accordingly, the claimed subject matter is intended to cover all modifications, equivalents, and alternatives falling within the scope of the technology as defined by the appended claims.

DETAILED DESCRIPTION OF THE INVENTION

The figures depict various embodiments described throughout the Detailed Description for the purposes of illustration only. While specific embodiments have been shown by way of example in the drawings and are described in detail below, the technology is amenable to various modifications and alternative forms. The intention is not to limit the technology to the particular embodiments described. Accordingly, the claimed subject matter is intended to cover all modifications, equivalents, and alternatives falling within the scope of the technology as defined by the appended claims.

As an initial and non-limiting explanation, certain approaches presented as examples herein may be categorized at least approximately into four general groups. For purposes of reference, the groups may be referred to herein as regional emphasis, visual fusion, adaptive breaks, and decision support; these names are not intended to be either precisely descriptive or limiting, but rather are presented for clarity of description herein.

With regard to the first group of approaches, regional emphasis, a differential in visual emphasis may be applied to a viewer's eyes by applying a differential in display emphasis so as to produce the desired visual emphasis differential. Such an approach may also be understood as providing a selective digital image filter that acts on one or more specific areas of visual content representing different areas of the retina. For example, some part of a display corresponding to a first visual region may be brightened or dimmed, increased or decreased in contrast, increased or decreased in color saturation, or otherwise, relative to another part of the display (or an area "off screen", e.g., beyond the edges of the display but still at least potentially within the viewer's field of view) that corresponds to a second visual region. As a more particular example, a first region of the display corresponding the viewer's central visual field may be decreased in brightness, so that the viewer's central visual field (or some portion thereof) receives less intense light from the display as compared to the viewer's peripheral visual field.

To continue the particular example above, a similar visual emphasis differential may be achieved by increasing the visual brightness in some or all of the viewer's peripheral visual field while leaving the visual brightness in the central visual field unchanged, or by increasing the visual brightness in the peripheral visual field while also decreasing the visual brightness in the central visual field. Yet again, such a differential may be achieved by increasing the visual brightness in both the central and peripheral visual fields but increasing the brightness more in the peripheral visual field than in the central visual field, or conversely by reducing the visual brightness in both the central and peripheral visual fields but decreasing the brightness more in the central visual field than in the peripheral visual field.

Other approaches also may yield a visual emphasis differential through applying a display emphasis differential, and such approaches are not limited. Regardless of precisely how the visual emphasis differential is accomplished, or the precise nature of that visual emphasis differential (e.g., which regions are emphasized or de-emphasized, whether emphasis change is through contrast, tint, brightness, video frame rate, etc.), in at least certain instances application of the visual emphasis differential may apply a bias against progressive myopia for the viewer. Whether such a bias may decrease the rate of progression of myopia, halt the progression of myopia, or even reverse the progression of myopia (i.e., reduce the degree of the viewer's already existing myopia) is not limited.

It is noted that the precise biological mechanism or mechanisms through which such regional emphasis approaches may yield a bias against progressive myopia may not be fully known or understood. Indeed, the particulars of the development of at least certain forms of progressive myopia may not be fully understood, either. For at least this reason, a fully comprehensive medical explanation of the mechanisms of the progression of myopia and/or the mechanisms for counteracting myopia is not attempted herein. (However, some degree of explanation is not necessarily excluded herein, and is it not asserted that an understanding of medical mechanisms is either completely unknown or impossible to determine, nor are approaches utilizing or dependent on specific mechanisms are necessarily excluded herein.) Moreover, so long as an overall function of achieving a bias against myopia may be accomplished, explanation of specific medical mechanisms of action may not be required. Such consideration of function without necessarily addressing specific medical mechanisms also applies to other groups of approaches herein, in addition to regional emphasis.

With regard to the second group of approaches, visual fusion, a viewer may be presented with two visual targets, and prompted so as to view the two visual targets in such a way as to produce the appearance of a third visual target manifesting as a fusion of the first two targets. In viewing the two targets in such way as to fuse together the third target, the viewer's eyes may behave in ways (e.g., in terms of focus, accommodation, pupil size, etc.) as may be beneficial in biasing against progressive myopia. The fusion itself, that is, the fact that the viewer sees a third target, may be illusory (that is, no third target physically may exist in a literal sense) and indeed may be largely or entirely irrelevant to myopia in itself. Rather, in causing the eyes to function in a particular way so as to yield such (apparent) visual fusion into a third target, the eyes may adjust in some fashion as may be useful in opposing myopia.

In some sense, the visual fusion in question thus might be considered as a sort of "exploit". In certain computer systems (e.g., games), existing functions may be adapted to perform actions that, while perhaps not intended, may be interesting and potentially useful. As a more concrete example, following an instruction to "place your game avatar here, spin 360 degrees, then step forward" may result in the character walking through a nominally solid wall within the game. Walking through the wall may not be a normal function, and the existence of such an exploit may not be readily evident from normal game play, but the game may simply function in such a fashion. Similarly, in doing something that in itself may serve no normal visual purpose—fusing two targets into a third target known to be spurious—the eyes may behave in a way that may be unexpected (or even counterintuitive) but that may still accomplish some useful function (though that function may not be readily apparent to the viewer).

Likewise, in some sense regional emphasis approaches also may be considered as being a form of biological exploit. Even if no causal link were immediately evident between decreasing myopia and causing a display emphasis differential by changing color contrast on different regions of a display, nevertheless applying such a display emphasis differential may result in behaviors within the eye as may lead to such a decrease in myopia.

Thus, as noted with regard to regional emphasis approaches, visual fusion approaches may not depend on a fully comprehensive understanding of precisely what is happening in the viewer's eyes and/or brain in order to function. As such, comprehensive descriptions of such phenomena are not necessary to the functionality of visual fusion approaches, and are not presented herein (though some degree of explanation may be presented for illustrative purposes).

Moving on to a third group of approaches, adaptive break approaches approach progressive myopia in prompting viewers to take a break from screen use, so as to "rest their eyes". However, adaptive break approaches may also include arrangements for making use of audio descriptions of on screen content, so that a user may continue working (or otherwise using a system with a display, and/or performing useful functions) without interruption, even while resting their eyes. For example, AI systems may be suited to convert text content as may otherwise be presented on a visual display into audio content as may be presented through a speaker.

Further, AI systems may be suited to interpret non-text content, e.g., images, video, etc., through direct text description of such content via audio and/or through some symbolic approach. As a simple example of a symbolic approach, if the display content were monitoring some computer system, nominal operation of that system may be represented through a certain musical passage (e.g., one intended to be calming), while problems may be represented by various discordant tones or other more animated musical passages.

Alternately, audio may be presented not to convey information (or not only to convey information) but to enhance restfulness so as to make a visual break more effective, or even merely more pleasant for the user, etc. Music may be presented, audio instructions of various forms (when to begin, actions to take such as removing glasses, closing eyes, etc.), and so forth.

In addition, individual needs for eye rest may vary considerably. Just as a propensity towards myopia may depend on many factors, at least some of which may be highly individual (e.g., screen time on various types of screen, personal heredity, etc.), it may be useful to tailor the duration of breaks, the intervals between breaks, the form and/or content of breaks, etc. to individual users. Consequently, an adaptive system may consider the user's particulars, viewing habits, etc. may be useful, as opposed to (for example) a simple fixed timer system (though timers or other non-tailored approaches also are not excluded). Such an adaptive system may be implemented as an application on a system connected to a given display itself (though this is not necessarily required).

With regard to the fourth group of approaches, decision support, as may be understood from descriptions of the preceding first, second, and third groups of approaches, causes of progressive myopia (and/or other concerns) may be complex, subject to many possible factors, and/or may be strongly influenced by the particulars of an individual. Likewise, potential responses for biasing against progressive myopia (and/or other concerns) may exhibit great flexibility, with a very large range of possible interventions. However, both the complexity of the causes of myopia and even the many possible interventions against myopia may in themselves present problems. For example, while a medical professional may rely upon experience and judgment for medical problems and solutions with only one relevant criterion, or several such criteria, at some point the number of "dimensions" to the problem and solution may become too great for even an expert medical professional to evaluate "freehand".

As a more concrete example, if progressive myopia were a function only of the amount of screen time to which a person is exposed during a day (it is emphasized that this is an example for illustrative purposes, and no assertion is made that causes of myopia are indeed so simple), then the problem could be understood as being in some sense one dimensional. A single question—how much time does the subject spend viewing display screens in a day, or a week, etc. —could in such instance determine prognosis, diagnosis, and expected response to treatment. Evaluation of a one dimensions problem may be relatively straightforward, within the capabilities of even an untrained person. If (likewise hypothetically) only screen time, gender, age, and ethnicity were relevant, the problem could be understood as four dimensional. A medical professional with suitable training may manage such a more complex problem. However, if, as may be, the number of possible relevant factors is much higher, the problem may be understood as 10 or 20 or 50 dimensional. (No representation is made as to an actual, exhaustive count of factors potentially relevant to myopia; the numbers should be taken as illustrative.) At some point, a problem may have too many dimensions, or in other terms may simply be too complex, for an individual without additional support to determine useful solutions regardless of training.

Thus, decision support tools may be useful in assisting medical professionals in efficiently and effectively diagnosing, treating, and evaluating progressive myopia and/or other concerns. In particular, though not exclusively, artificial intelligence ("AI") systems engaged with large learning model (LLM) information may be useful in providing decision support for highly complex problems such as those relating to progressive myopia. Decision support approaches may facilitate a sort of pre-processing of relevant factors and data, facilitating a medical professional in then making judgments as to matters such as diagnosis, treatment, and evaluation of ongoing patient health.

As may be understood from descriptions of regional emphasis, visual fusion, and adaptive breaks above, decision tool approaches may inform and/or support any or all such approaches. While decision tool approaches as considered herein are not necessarily limited only to informing and/or supporting other approaches herein, nor are such regional emphasis, visual fusion, and adaptive break approaches limited only to cooperation with decision tool approaches, it is noted that cooperation among the various approaches as described herein may be fruitful.

Now with regard specifically to FIG. 1, and with consideration of regional emphasis as noted herein, therein in FIG. 1 is shown an illustration of a visual field 102 of a human eye. The visual field 102 as shown extends only to 30 degrees off center; this is for illustrative purposes and should not be taken to suggest that a human visual field is limited only to 30 degrees off center, nor that only a portion thereof out to 30 degrees if of significance, nor that only such portion may be considered herein. Further, it should be understood that a map of the visual field 102 as presented herein (and as may be considered by eye science and medicine generally) may be at least somewhat idealized and/or arbitrary, as a real world retina may not map perfectly to such a map, etc. The visual field 102 is presented herein for explanatory purposes.

As may be seen, a boundary line 104 is shown marking a radius of 5 degrees from center. The boundary line 104 may be understood to represent a distinction between the central visual field 108 and the peripheral visual field 112. In practice, the division between central visual field 108 and peripheral visual field 112 may not be sharp, uniform, and/or consistent from person to person, but for purposes of illustration and discussion herein such a 5 degree boundary 104 may be useful. Typically however, at least some degree of qualitative difference may exist between a central visual field 108 and a peripheral visual field 112, for example a central visual field 108 may exhibit higher spatial resolution, greater sensitivity to color, etc., while a peripheral visual field 112 may exhibit superior motion detection, greater overall light sensitivity, etc. For purposes herein an understanding of the precise distinctions therebetween in terms of a subject's vision may not be necessary (and indeed a fully comprehensive understanding may not be known to medical science), thus, such distinctions are not addressed in detail herein. Similarly, while physiological responses to differing visual stimuli in different portions of a subject's visual field may affect eye function and even eye anatomy, e.g., so as to bias an eye against progressive myopia, the effectiveness of applying a visual emphasis differential to various regions of a visual field, while of medical interest, may not be dependent on a fully comprehensive understanding of such effects on eye function and/or eye anatomy. (Furthermore, precise details of such matters regarding eye and brain structure and function may not be wholly uniform among all subjects, thus a fully precise description thereof may not be possible even in principle.) In more colloquial terms, an understanding of precisely how regional emphasis works may not be required for regional emphasis to work (and how regional emphasis works likewise may not be fully understood by medical science in practice). Thus, particular changes to the eye in response to regional emphasis approaches also are not described herein in detail. For purposes of discussion herein, a broad understanding that a difference between the central visual field 108 and the peripheral visual field 112 may be of use, however, in understanding what steps may be taken so as to accomplish a bias against progressive myopia as presented herein (e.g., by applying a differential in visual emphasis to different portions of the visual field, as described in more detail subsequently herein).

Figure 2:
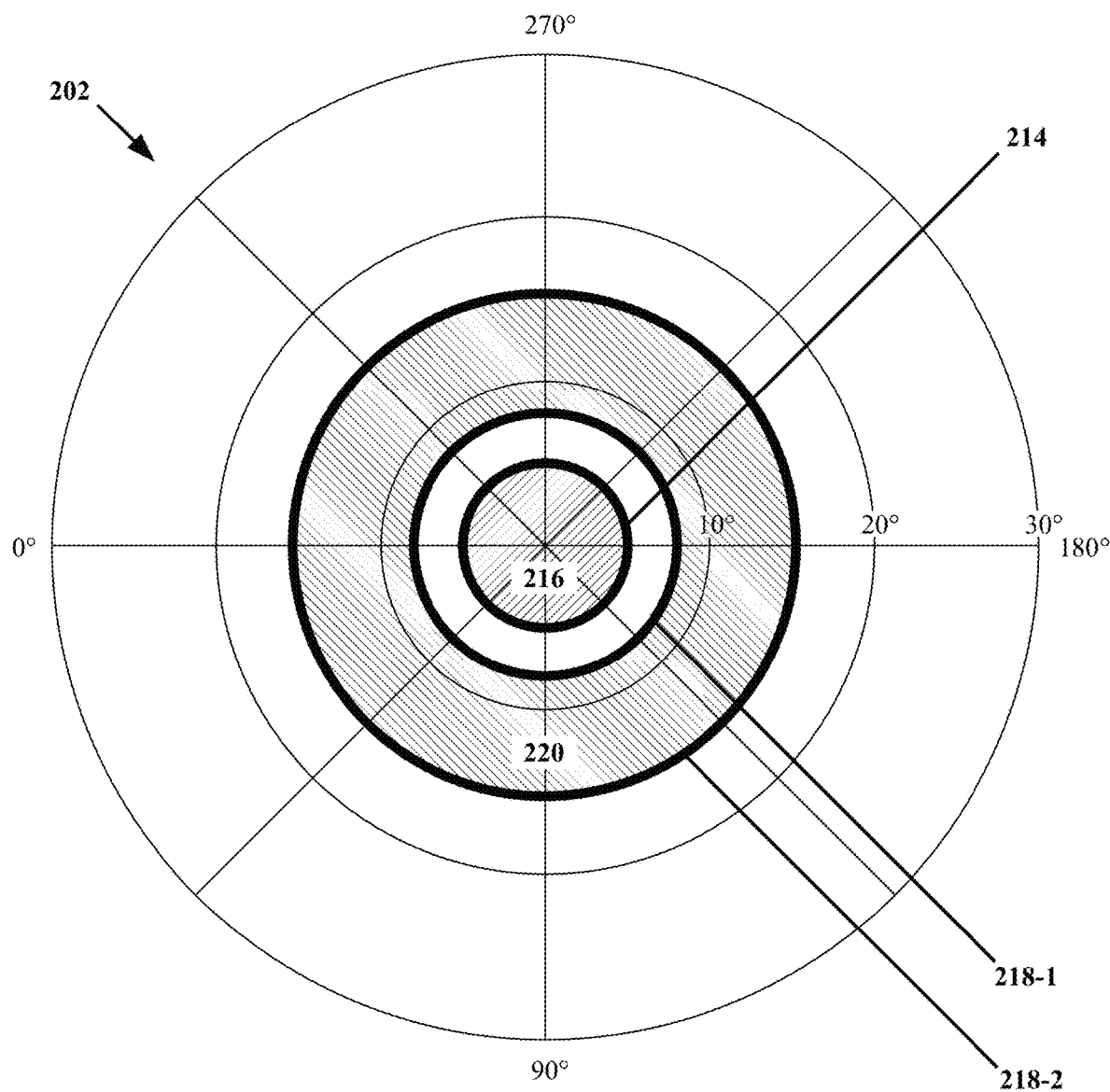
FIG. 2 shows another example illustration of a visual field of an eye, in geometric representation, with example first and second visual regions indicated.
Figure 3:
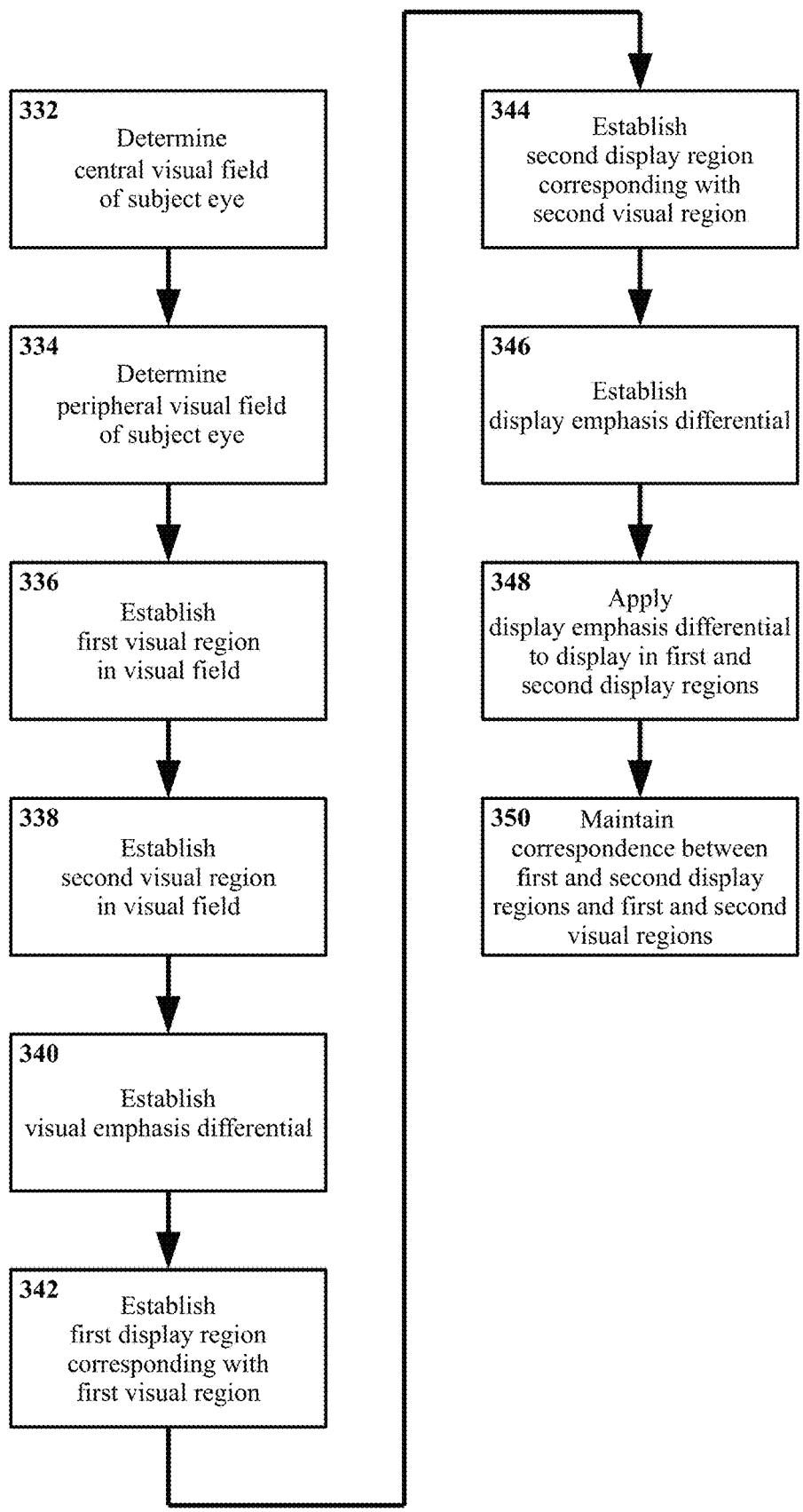
FIG. 3 shows an example method for regional emphasis, in flowchart form.

With reference now collectively to FIG. 2, FIG. 3, and FIGS. 4A-4C, certain discussion with regard thereto is presented herein with reference more than one such figure at a time. In FIG. 3 method steps are presented, while certain concepts related to method steps in FIG. 3 are graphically depicted in FIG. 2 and FIGS. 4A-C. Explanation of what, for example, the various regions referenced in FIG. 3 are and/or do and/or how regions interrelate may be useful in developing an understanding of the method presented in FIG. 3. Thus, discussion of FIG. 2, FIG. 3, and FIGS. 4A-C may not be fully segregated by figure, and references to elements of more than one such figure may be present, for explanatory purposes.

Turning to FIG. 2, another illustration of a visual field 202 is shown therein. As in FIG. 1 a boundary line 216 is shown in FIG. 2 at approximately 5 degrees, however in FIG. 2 the boundary line 214 defines a first visual region 216, that is, a first portion of the visual field 202 of an eye under consideration. Also in FIG. 2, boundary lines 218-1 and 218-2 are shown, defining a second visual region 0220. Where the first visual region 216 extends from approximately 0 to 5 degrees, the second visual region 220 extends from approximately 8 to 15 degrees, with a gap (not identified numerically) between 5 and 8 degrees. The first and second visual regions 216 and 220 may correspond with particular anatomical regions and functions of the retina of the eye, but rather than specify precise anatomical locations and/or functions it may be convenient to consider and describe the first and second visual regions 216 and 220 in terms of areas "mapped" on the visual field 202.

Several observations are presented with regard to the first and second visual regions 216 and 220 as shown in FIG. 2. The first visual region 216 is shown to be circular, centered on the central point (0 degrees) of the visual field 202, and covering the entirety of an idealized 5 degree central visual field (as referenced in FIG. 1) but no other portion of the visual field 202 (e.g., the first visual region 216 as shown in FIG. 2 does not extend to any portion of the peripheral visual field). The second visual region 220 is shown to be annular, covering some but not all of the idealized peripheral visual field (as also referenced in FIG. 1). Further, an annular gap exists between the first and second visual regions 216 and 220, with no point of adjacency and no area of overlap as illustrated in FIG. 2.

It is noted that such parameters are illustrative only, and neither required nor limiting. The first and/or second visual regions 216 and 220 may exhibit different shapes than shown in FIG. 2, and may occupy different portions of the visual field 202. The first and second visual regions 216 and 220 may be adjacent over some or all of the respective perimeters thereof, and/or may overlap. Thus, a gap therebetween may not be present, and/or when present may differ in size and/or shape. In particular, the first visual region 216 need not occupy the entire central visual field and need not completely exclude the peripheral visual field; likewise the second visual region 220 need not be disposed only within the peripheral visual field, etc. In addition, while only first and second visual regions 216 and 220 are illustrated in FIG. 2, approaches are not necessarily limited only thereto; a third visual region (or further), while not illustrated, is not prohibited. FIG. 2 should be understood as an example only, for purposes of explanation.

Turning to FIG. 3, therein is presented an example method for applying a bias against progressive myopia utilizing a regional emphasis approach, in flow chart form. In the arrangement presented in FIG. 3, a central visual field is determined at step 332. Similarly, a peripheral visual field is determined at step 334.

The term "establishing" as used herein, should be understood broadly. In establishing a visual field or portion thereof, a visual or display region, a differential, etc., such elements may be measured, defined, predetermined, calculated, estimated, considered as a convention, determined through medical judgment, loaded onto a processor as data and/or executable instructions, selected by a user, etc. It is noted that such options are not necessarily exclusive, and a given embodiment may utilize more than one. So long as the element under consideration in some fashion becomes available for the purposes herein, the manner by which an element is established is not limited.

Thus, for example, in certain embodiments it may be that the central and peripheral visual fields may be established at steps 332 and 334 through being measured, e.g., by visual testing of a subject, by imaging and/or mapping the retina of the subject, etc. However, for other embodiments the central and peripheral visual fields may be established at steps 332 and 334 as predetermined approximations, e.g., the central visual field may be considered as extending from 0 to 5 degrees from center and the peripheral visual field extending beyond 5 degrees from center. Other approaches also may be suitable. While such comments are presented using method steps 332 and 334 as examples, it should be understood that (unless physically or logically impossible, etc.) such comments may also apply to other method steps, apparatus elements, etc., herein.

In addition, with regard to establishing the central and peripheral visual fields at steps 332 and 334, in addition to (or in place of) determining an extent, condition, etc. of the central and peripheral visual fields steps 332 and 334 may include identifying where the central and peripheral visual fields are disposed. That is, where and/or at what is the subject looking? While the central and peripheral visual fields may be at least approximately stable in position and extent with regard to the overall visual field (and/or retina) for a given subject, the "aim" of an eye may shift dramatically over time. Thus, it is noted that establishing the central and peripheral visual fields at steps 332 and 334 may be ongoing processes in at least certain embodiments.

Continuing in FIG. 3, a first visual region is established at step 336 within the visual field. A second visual region is also established at step 338 within the visual field. Referring to FIG. 2, example first and second visual regions 216 and 220 are illustrated therein, as previously described. Broadly speaking, and also with consideration for FIG. 3 as well, for at least certain embodiments, it may be useful for the first visual field 216 to be established at step 336 so as to be disposed at least approximately within the central visual field 216, and for the second visual field 220 to be established at step 338 so as to be disposed at least approximately within the peripheral visual field 220.

For purposes of providing a numerical example in establishing the first and second visual regions 216 and 220 at steps 336 and 338, it may be useful for at least certain embodiments to establish the first visual region 216 at step 336 so as to be approximately circular extending from 0 degrees to approximately 4 to 6 degrees, and to establish the second visual region 0220 at step 338 so as to be approximately annular with an inner boundary at approximately 4 to 6 degrees and an outer boundary at approximately 8 to 15 degrees.

Thus, in such embodiments, the first visual region 216 may at least approximately correspond with the central visual field 108 as illustrated in FIG. 1, and the second visual region 220 may at least approximately be disposed within the peripheral visual field 112 outside but proximate to the central visual field 108. However, while in practice such arrangements may be useful in at least certain instances, and while certain explanatory discussions herein may refer to such a "central and peripheral" approximation with regard to first and second visual regions 216 and 220, such numerical definitions and overall configurations are not limiting, and other arrangements also may be suitable.

As noted with regard to establishing, in FIG. 3, the central and peripheral visual fields at steps 332 and 334, establishing the first and second visual regions at steps 336 and 338 may include identifying where and/or at what the subject may be looking, since if (as shown in FIG. 2) the first and second visual regions 216 and 220 are defined with regard to the visual field 202, as the subject's eye shifts aim point the alignment of the first and second visual regions 216 and 220 with the visible world may change over time. Thus, even if the first and second visual regions 216 and 220 are defined (or otherwise established) so as to be spatially fixed with regard to the visual field 202 overall (which is not required; other embodiments may utilize first and second visual regions 216 and 220 that may vary, e.g., over time), the steps 336 and 338 in FIG. 3 of establishing the first and second visual regions also may be ongoing processes in at least certain embodiments.

Returning specifically to FIG. 3, a visual emphasis differential is established at step 340 between the first and second visual regions. A visual emphasis differential refers to some desired or delivered difference in visual stimuli as presented to the eye. For example, a difference in brightness may serve as a visual emphasis differential (though many other variations may be suitable). More concretely, with reference again to FIG. 2, a visual emphasis differential in brightness may constitute a lesser default brightness delivered to the first visual region 216 as compared with the second visual region 220. As may be understood, such a differential may be accomplished in various ways, e.g., by decreasing the brightness in the first visual region 216, by increasing the brightness in the second visual region 220, by decreasing the brightness in the first visual region 216 and also increasing the brightness in the second visual region 220, by increasing the brightness in the first visual region 216 but also increasing the brightness in the second visual region 220 more, by decreasing the brightness in the first visual region 216 but also decreasing the brightness in the second visual region 220 less, etc.

Thus, considering the (non-limiting) example previously described, wherein the first visual region 216 is disposed with the central visual field and the second visual region 220 is disposed within the peripheral visual field, such an arrangement may (in more concrete terms) represent decreasing the amount of light (e.g., brightness) delivered to the central visual field as compared to the peripheral visual field. In at least certain cases, such a broad approach—decreasing the relative amount of light delivered to the central visual field 216 compared to the peripheral visual field 220—may be useful in producing a bias away from progressive myopia.

Conversely, in other cases a broad approach of decreasing the relative amount of light delivered to the peripheral visual field 220 compared to the central visual field 216 also may be useful. However, as already noted, such an approach, while potentially useful in certain instances, may not be useful in all instances, and other approaches may be suitable.

With regard to terminology, as used herein "emphasis" refers a visual property such as brightness, and/or a level or degree thereof. Emphasis does not necessarily imply that such properties have been "emphasized" or increased, nor even necessarily that such properties have been decreased. (Though an emphasis differently may imply such an increase or decrease.) Rather, emphasis refers to the degree of some visual property. For example, the amount of brightness delivered to the eye may understood to be the emphasis (or the tint, the focus, etc.). Emphasis in one or more regions (or in the full field of view) may be increased or decreased, so as to present a visual differential in emphasis between those regions.

It is noted that properties such as brightness may vary naturally within an environment. As a simple example, viewing a light source presents high brightness within the portion of the visual field aligned with the light source but lower at some distance from that light source. Such a natural spatial variation in brightness does not imply or constitute an emphasis differential; rather, such a natural difference in brightness is simply part of the visual content. In contrast, a visual emphasis differential may be a deliberately adjusted difference in the level of brightness reaching the eye from various areas, as distinct from the natural brightness variations in the physical world. In some sense a visual emphasis differential may be understood as an effect being "layered on top of" the light that may otherwise reach a viewer's eye. In terms of physical optics, brightness may be reduced in some area with a dark filter, etc. (though typically but not necessarily differentials herein may be accomplished digitally, e.g., through screen modification).

Returning specifically to FIG. 3, with regard to establishing the visual emphasis differential at step 340, typically though not necessarily the visual emphasis differential may be established at step 340 based on what may be expected or understood to apply a bias against progressive myopia to a subject's eye. Thus, the visual emphasis differential may be the desired visual stimulus to be delivered to the eye such that the eye (through whatever response, whether biochemical, anatomical, etc.) tends to bias against myopia. In some sense the visual emphasis differential may be understood as the "target" stimulus to be provided to the eye (though ideally the visual emphasis differential may also be the stimulus that is in fact delivered to the eye).

It is noted herein that the processes by which the eye responds to stimuli are not directly created, initiated, implemented and/or controlled herein. Rather, a stimulus may be applied (e.g., in the form of a visual emphasis differential) and the eye responds as the eye responds. Thus applying a visual emphasis differential may be therapeutic, e.g., beneficially affecting the biology and/or functionality of the eye, but the biology and/or functionality of the eye itself is not asserted to be either carried out or directly controlled herein.

Still with reference to FIG. 3, as has been noted previously herein that "establishing" may constitute a variety of processes. Establishing a visual emphasis differential at step 340 may include examining and/or otherwise evaluating the subject, the subject's medical condition, more specifically the medical condition of one or both eyes including but not limited to the shape of the eye overall and/or the retina, the visual responsiveness, the retina appearance, the responsiveness of the pupil to light, etc. Medical and/or visual examinations and testing may be carried out separately, whether beforehand, on an ongoing basis, etc., from treatment, thus establishing a visual emphasis differential at step 340 in some sense may not be a "self-contained" step. However, why medical examination (and/or other processes) in establishing the visual emphasis differential in step 340 is not prohibited, neither is such required. Thus in certain embodiments a visual emphasis differential may be established at step 340 based on a predetermined standard value, etc.

Moving on in FIG. 3, a first display region is established at step 342 corresponding with the first visual region, and a second display region is established at step 344 corresponding with the second visual region.

Figure 4A:
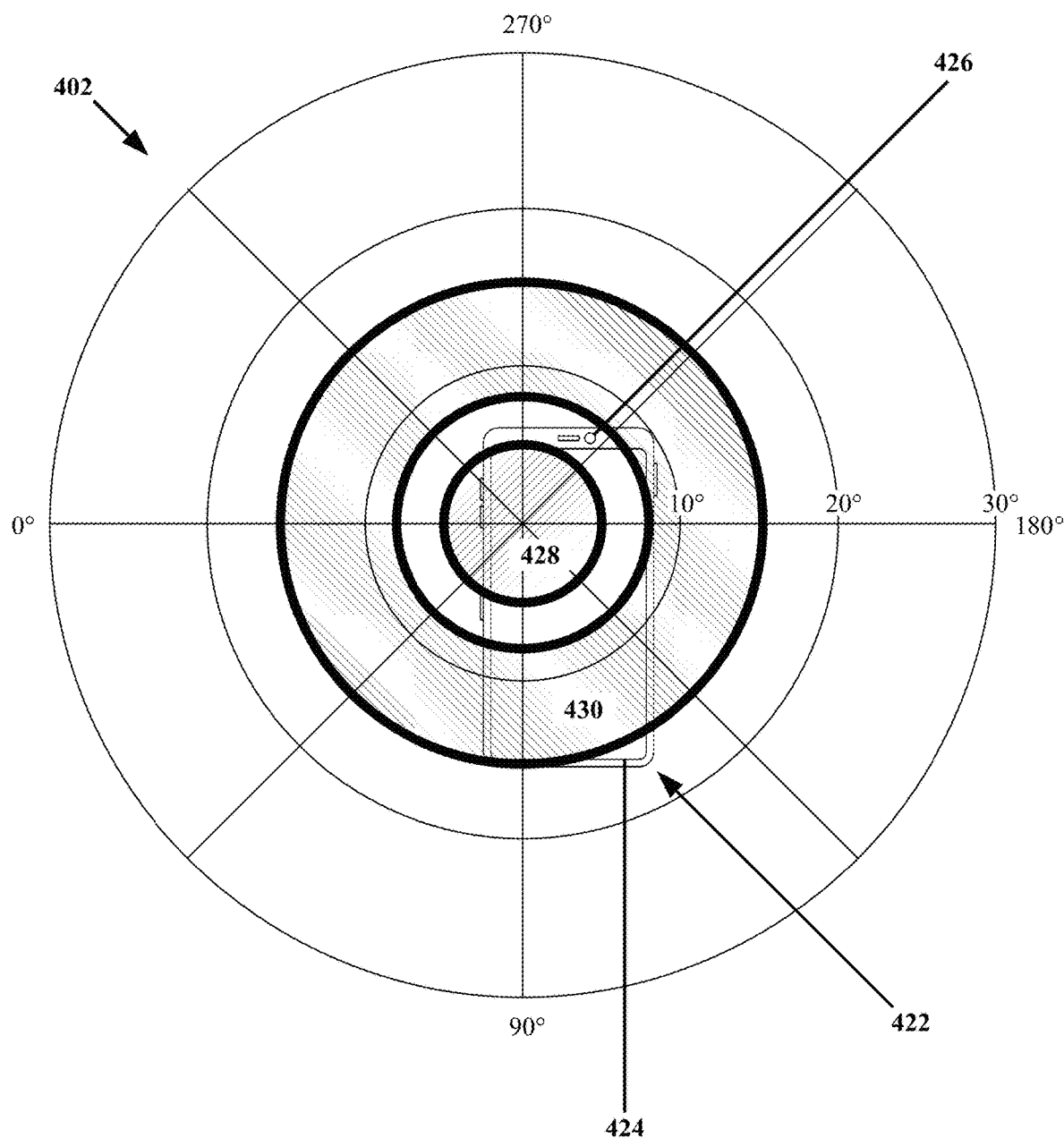
FIG. 4A shows another example illustration of a visual field of an eye, in geometric representation, with example first and second display regions indicated with respect to a display.

Typically though not necessarily the first and second display regions are locations on or with respect to a physical display, such as a graphical display on an electronic device. With reference now to FIG. 4A, an arrangement at least somewhat similar to that in FIG. 2 may be observed therein, with a visual field 402 marked in terms of angular positions, and regions indicated thereon. However, FIGS. 4A-C also shows a device 422, as shown a smart phone. The device 422 has a graphical display 426 such as may be an LED display, and also an imager 426 such as may be a digital camera. (The particular device 422, display 424, and imager 426 are examples only, and are not limiting. Moreover, not all elements will necessarily be required for all embodiments, e.g., an imager 426 may not be present.)

Figure 4B:
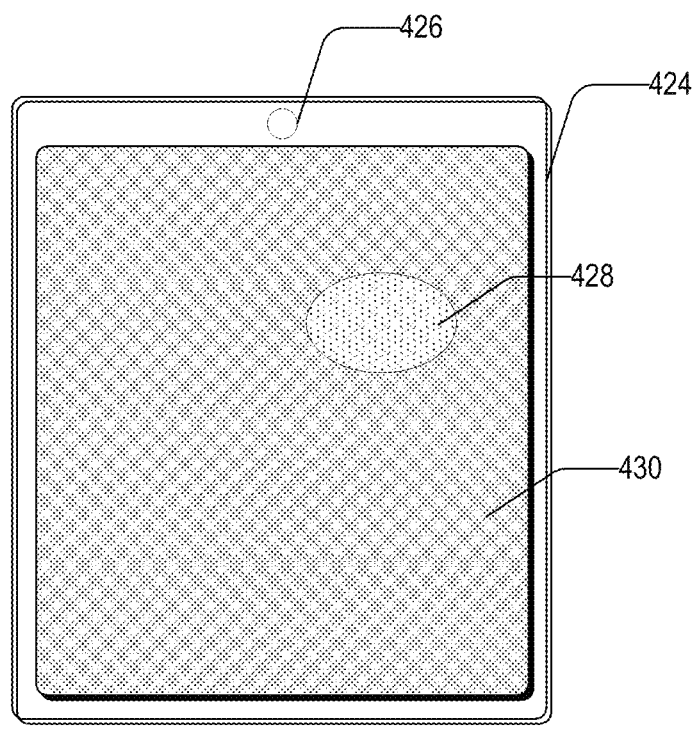
FIGS. 4B and 4C show example illustrations of a display device.
Figure 4C:
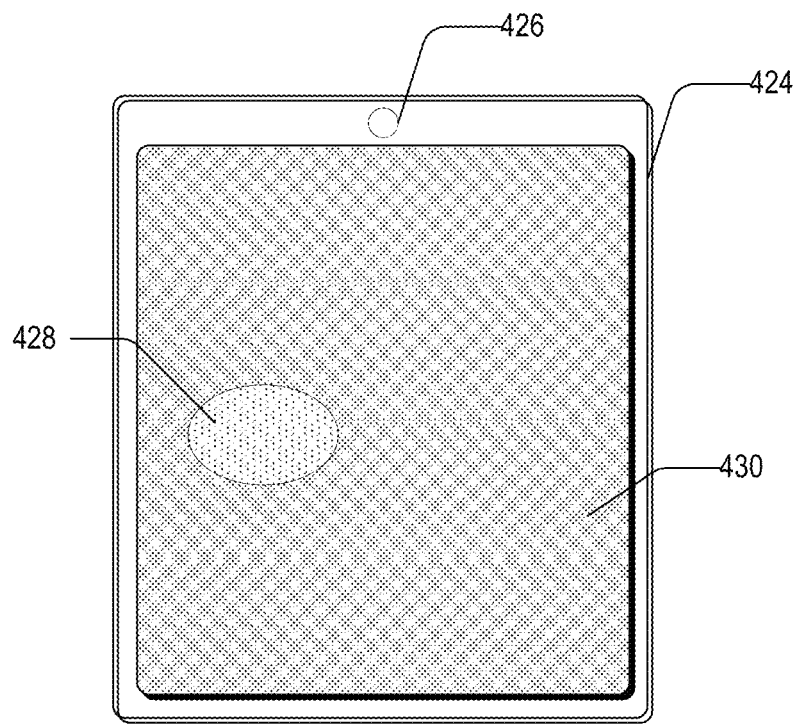

Also in FIGS. 4A-C, a first display region 428 and a second display region 430 are shown. A comparison of the first display region 428 and a second display region 430 with respect to the associated visual field 402 in FIG. 4A and the first visual region 216 and second display region 220 with respect to the associated visual field 202 in FIG. 2 may reveal a correspondence between the first display region 428 and the first visual region 216, and likewise between the second display region 430 and the second visual region 220. That is, the first display region 428 and the first visual region 216 are at least approximately similar in size, shape, and disposition within respective visual fields 202 and 402. Similarly, the second display region 430 and the second visual region 220 are at least approximately similar in size, shape, and disposition within respective visual fields 202 and 402. More particularly, in FIGS. 4A-C the first display region 428 is approximately circular with an extent of approximately 5 degrees from center, while the second display region 430 is approximately annular with an extent between approximately 8 and 15 degrees from center, similar to the geometrical forms shown in FIG. 2 for the first and second visual regions 216 and 220.

Such correspondence between the first display region 428 and the first visual region 216 and between the second display region 430 and the second visual region 0220 is deliberate. Given the arrangement of a subject's visual field 402 in FIG. 4A, that is, given where the subject is looking, what is present within the first display region 428 and the second display region 430 may be anticipated to be received within the subject's first visual region 216 and second visual region 220 respectively.

As noted with regard to establishing the central and peripheral visual fields at steps 332 and 334 in FIG. 3, and establishing the first and second visual regions at steps 336 and 338, establishing the first and second display regions at steps 342 and 344 may include identifying where and/or at what the subject may be looking, since if (as illustrated in FIG. 4A) the first and second display regions 428 and 430 are defined with regard to the visual field 402, as the subject's eye shifts aim point the alignment of the first and second display regions 428 and 430 with the visible world may change over time. Thus, even if the first and second display regions 428 and 430 are defined (or otherwise established) so as to be spatially fixed with regard to the visual field 402 overall (which is not required; other embodiments may utilize first and second display regions 428 and 430 that may vary, e.g., over time), the steps 340 and 344 in FIG. 3 of establishing the first and second display regions also may be ongoing processes in at least certain embodiments.

Referring again now to FIG. 3 and continuing therein, a display emphasis differential is established at step 346, and the display emphasis differential is applied to the display at step 348 so as to affect the first and second display regions 428 and 430 as shown in FIGS. 4A-C. A display emphasis differential may be understood as a change or changes applied to the output of a display 424 within first and second display regions 428 and 430 so as to produce a particular visual emphasis differential to the subject (e.g., to the subject's retina) within first and second visual regions 216 and 220. Thus, by applying a differential to what is displayed, e.g., by electronically controlling output from a physical screen, a desired differential may be applied to what is received by a subject's eye. Suitable selection and control of the display emphasis differential thus may yield the previously mentioned visual emphasis differential, which in turn may prompt a suitable response by the eye so as to bias against progressive myopia (and/or other conditions).

Continuing in FIG. 3, the correspondence between first and second display regions and first and second visual regions is maintained at step 350. For example, as the subject shifts their eyes to look at different things, the portions of a display 424 as shown in FIGS. 4A-C that are within the first and second display regions 428 and 430 also may shift. To maintain correspondence at step 350 as in FIG. 3, different parts of the display 424 in FIGS. 4A-C (and/or some other display different from what is shown) may be made to be affected by the display emphasis differential, e.g., different pixels may be brightened, dimmed, etc.

It is emphasized that in at least certain instances the display emphasis differential is applied at step 338 as shown in FIG. 3 through control of the display 424 as shown in FIGS. 4A-C. Brightness (and/or some other property of output) is adjusted, for example, in one or both of the first and second display regions 428 and 430. Typically, though not necessarily, the display 424 may be under control of the device 422 to which the display 424 is engaged, thus altering output may be readily accomplished through executable instructions instantiated on that device 422, or otherwise through control of the device 422. Thus, the use of separate physical optics and/or other elements such as filters, lenses, etc. may not be necessary. More concretely, it may not be necessary for a subject to wear glasses or goggles with a shaded filter to decrease brightness, lenses to adjust focus, etc. The effects thus may be "transparent" to the subject (in a non-literal sense; the difference in emphasis may be literally visible), e.g., the user of the device 422; no additional action may be required by the user, such as wearing special glasses. Furthermore, the effects may be limited to the display 422 in question, not affecting general vision elsewhere, e.g., in the room or other space where the subject may be disposed. The user may not have to do anything, wear anything, etc., beyond changes introduced to the operation of the device 422.

Moreover, various aspects may be adjusted, as physical optics and/or certain other potential mechanisms may not. The size, shape, position, number, overlap, etc. of the first and second visual regions 216 and 220 as illustrated in FIG. 2 may be varied, for example. Likewise, the particulars of the visual emphasis differential between first and second visual regions 216 and 220 may be varied. To achieve such effects, the display emphasis differential between first and second display regions 428 and 430 and the size, shape, position, number, overlap, etc. of the first and second display regions 428 and 430 themselves also may be varied.

Such changes may be made to tailor a visual emphasis differential to a particular individual subject or group of subjects, e.g., by selecting what modifications of light are made to what areas of the subject's visual field, e.g., as or before treatment begins, based on the specific needs and responsiveness of the subject or subjects. As the visual emphasis differential is implemented (ultimately) through modifying display output, a high degree of initial personalization may be achieved.

Such changes also may be made as an ongoing process, e.g., in response to the development (or lack of development) of the subject's vision once treatment has begun. Again, modifying display output to achieve a bias against progressive myopia may facilitate a high degree of customization and adaptation to the needs of a given subject.

Such changes further may be made on an approximately real time basis, e.g., over the course of a day the degree of visual emphasis differential desired and delivered may be varied through adjusting the display. It may be that for at least certain individuals long periods of exposure to displays may produce more pronounced or even different effects than shorter periods. Thus, if for example a subject were to use a given display for 8 hours a day, the various regions, differentials, etc. may be adjusted over the course of those 8 hours (e.g., increasing, decreasing, or changing the type of corrections being applied via a visual emphasis differential) in order to adapt to changing circumstances and medical conditions over those 8 hours.

Further, it is noted that because display regions and a display emphasis differential may be controlled by adjusting the display output, it may be possible to vary the display emphasis differential in both magnitude and type, and to do so over similar time scales (e.g., to personalize treatment initially, customize ongoing treatment, modify treatment in real time, etc.). For example, if the display emphasis differential is a brightness differential, the brightness differential may be "turned up" or "turned down" over time (or even reversed, so that the formerly brighter area becomes the dimmer area). More concretely, a nominal 20% difference in brightness could be increased to 30% or decreased to 10% (and so forth) as may be useful, on a time scale as may be useful.

However, while brightness may be useful as a simple example of a differential (whether considered at the display or on the retina), numerous other differentials may be utilized. Any property as may be adjusted in a display, and/or as may be usefully applied to a subject's vision to produce beneficial effects, may be utilized.

For example, differentials may address contrast, such as either a change in the overall brightness-to-darkness variability of content or partial changes such as brightness-to-darkness of one color channel (e.g., red, green, and/or blue), etc. Increasing contrast may deliver imagery that is better defined, more stark, etc., while decreasing contrast may present imagery as more even.

Differentials may address saturation, such as the "redness" of a red channel (and/or similarly for other color channels). Increasing saturation may tend to make content more colorful, and may increase perceived brightness even if light levels are unchanged, while decreasing saturation may make colorful more gray, and/or more "bland" in appearance.

Differentials may address resolution, such as the number of pixels per unit area, the number of lines per lineal unit, etc. Increasing resolution may make imagery appear better defined and/or clearer, while decreasing resolution may make content appear more granular or "blocky".

Differentials may address tint, such as providing an overall color "cast" to imagery. For example, imagery may be made to appear "more blue" overall (as distinct from showing a more saturated blue, wherein only portions already blue will appear to become more blue; a blue tint may add blue to portions that do not previously include blue), less blue, more or less red, green, cyan, etc.

Differentials may address display refresh rate. At least certain visual displays update pixel values (or other graphical properties) on an at least approximately regular interval, typically tens to hundreds of times per second. Increases and/or decreases in refresh rate may not present easily quantifiable differences in imagery, but may nevertheless be perceivable by at least some subjects (and may at least potentially be useful in addressing myopia for at least some subjects). In at least certain instances content at a higher refresh rate may appear to have smoother animation, clearer imagery, and so forth.

Differentials may address video frame rate. Video frame rate may in certain instances exhibit similarities to refresh rate. More frames per second may present as smoother animated content, while fewer frames per second may appear "choppy" or "jittery". As with refresh rate, effects may be difficult for subjects to quantify and/or specify, but may be noticeable.

Differentials may address animation speed. Animation speed may refer to how quickly a given animation cycles through visual changes. Increasing animation speed may present an appearance of more active or "busier" content, while decreasing animation speed may result in a more calm, less active appearance. It is noted that a differential may include either completely stopping existing animation, so that content nominally animated is presented as static imagery; and/or a differential may include animating nominally static imagery so as to change over time. One simple example may be to present small variations over time in the color values of pixels, so that while it may appear that "nothing is moving" the eye may still receive an impression of movement. (A physical world example might be rippling leaves or sparkling water at a distance. The water never "goes away" as such and may have no visible changes in structure, but a sense of motion may be received and/or apparent to a subject all the same.) Adding explicitly visible animations also may be suitable.

Differentials may address focus. Changes to focus may themselves be highly variable in nature. An overall focus may be increased or decreased (e.g., made longer or shorter), possibly appearing to go in or out of focus to a subject. However, localized focus differences, such as applying an impression of complex lenses, uneven lenses, arrays of micro lenses, or simple "waviness" as may be exhibited by light passing through uneven glass, or thermally convecting air, reflecting off a "funhouse" mirror, etc., also may be suitable.

Differentials may address sharpness. For example, certain displays may carry out (or be adapted to carry out) dithering or anti-aliasing, that is, blending adjacent pixels so as to smooth an otherwise stark distinction therebetween. Increasing sharpness by reducing or eliminating dithering may present a more defined appearance to content, and/or less smooth contours. Decreasing sharpness by initiating or increasing dithering may present smoother contours but a less defined appearance.

Differentials may address diffusion. Diffusion may refer to a process at least similar in concept to dithering, though typically diffusion may be applied more extensively to wider areas. Thus, while dithering as such may blend adjacent pixels, diffusion may blend pixels with other pixels several to many steps away, producing a blurred effect. For example, some forms of such blurring may be utilized in deliberately obscuring details in content, such as a face, a license plate, etc. However, diffusion may also be applied to areas of content rather than to elements of content (e.g., a geometrically defined region of a display rather than a face on that display). Adding or increasing diffusion may make content less pronounced and less clear, while decreasing or removing diffusion may make content more stark and sharp overall.

It is noted that not all displays necessarily may be suited for providing all possible display emphasis differentials (nor may all controllers for displays necessarily be so suited). As a simple example, a grayscale display may not be well suited to apply a differential including a tint or a change to color saturation. However, the ability or inability of a given display may not affect the usefulness of a given differential in instances when that differential may be delivered. So long as the display in use by the subject may present a given differential (either natively or through additional support, such as an overlay screen, etc.), that differential may be suitable.

In addition, while various examples of differential parameters are presented herein, such disclosure is not exhaustive and should not be understood to be limiting. Other parameters, e.g., polarization of light, wave phase, spectral range, etc. may be equally suitable, and are not limited. So long as a parameter may produce a useful effect (such as biasing against myopia), that parameter may be suitable.

Furthermore, it should be understood that a given embodiment is not limited to any one parameter or group of parameters (unless physically limited by display hardware, etc.). Multiple parameters may be considered within a differential, whether in or across different regions or within a single region. Thus, a first display region may exhibit a decrease in brightness while a second display region exhibits an increase in saturation, etc. Overlapping regions (if present) thus may affect portions within the overlap with changes to two (or more) different parameters.

Also, as previously noted differentials may be varied over time; similarly differentials may be varied over space. For simplicity first and second display regions herein and the display emphasis differential therebetween (and likewise first and second visual regions and the visual emphasis differential) are in places referred to as if uniform. That is, a 5% increase in brightness may be applied uniformly over an entire region, for example. However, it may also be suitable to apply an increase or decrease in brightness (or other property) that depends on angular distance from the center of the visual field, for example, or that may otherwise vary spatially. Indeed, there may be instances wherein it may be useful for a single region to exhibit an increase in brightness in some places and a decrease in brightness in others. (Although for clarity in such cases, it may be useful to contemplate dividing such a single region into two or more regions or sub-regions, the principle nevertheless applies.)

As may be understood from the preceding, the number of potential variables in both the desired/delivered visual emphasis at the retina and the corresponding display emphasis on the display may be extremely large. Further, the number of conditions as may affect whether a given configuration of visual and/or display emphasis may be useful also may be extremely large. Determining suitable parameters for delivering a bias against myopia (or some other benefit) may be sufficiently complex as to prove problematic for even a highly trained medical professional. This, it is noted that, while not necessarily interdependent, regional emphasis approaches and decision support approaches may in at least certain instances be usefully combined, e.g., using decision support to select the particulars for regional emphasis.

Referring again to FIGS. 4A-C, it is noted that in some sense the first and second display regions 428 and 430 as depicted thereon may be considered to be logically defined, rather than physical regions in the same sense as a piece of land with fixed and concretely defined boundaries. At a given moment, a given pixel on the display 422 may belong to a first display region 428, a second display region 430, (or both, if the first and second display regions 428 and 430 were to overlap, though this is not shown in FIGS. 4A-C), or to neither. However, which region(s) a pixel is part of may vary from moment to moment, depending on how the subject's eyes are aligned, where and in what orientation the device 420 is held relative to the subject, etc. Likewise, from the standpoint of the first and second display regions 428 and 430, the portion(s) of the display 422 covered by each also may vary from moment to moment. Thus, while first and second display regions 428 and 430 may include physically real pixels, the pixels that are within the first and second display regions 428 and 430 may not be constant over time. Thus, the first and second display regions 428 and 430 are not permanently demarked pieces of a given display 422, but rather (as noted) logical areas.

Further, it is noted that as shown in FIG. 4A a minority of the first display region 428 and a majority of the second display region 430 are, in the particular instance illustrated, not aligned with the display 422 and thus have no pixels therein (assuming the display 422 to be pixel based, which is not required but may be considered for explanatory purposes). Typically portions of the first and second display regions 428 and 430 not aligned with a display 422 may not be modified in output, and thus no display emphasis differential between off-screen portions may be applied. (Though "virtual" screens, projections, reflex or holographic displays, etc., as may not be defined as purely physical objects may also be suitable, and may not be subject to such concerns.) It should be understood that applying a display emphasis differential in portions of the first and second display regions 428 and 430 that do not overlap a display 422 adapted to provide such a display emphasis differential is not required, and should not be assumed to be either required or an obstacle to function.

However, while off screen areas may not be readily modified with a display emphasis differential, it is not excluded to consider the visual properties of off screen areas around a given display 422 when establishing differentials and regions. For example, if it is known that the area around the display 422 is dark (e.g., because the subject is using the device 420) in an otherwise dimly lit room, that darkness may be considered in establishing differentials and regions. Such consideration is not required, but also is not prohibited, and may in at least certain instances be useful.

Still with reference to FIGS. 4A-C, as noted the first and second display regions 428 and 430 may shift based on eye motion of the subject. It is also noted that the size and shape of the first and second display regions 428 and 430 may vary based on how and where the device 420 is disposed relative to the subject. For example, a display 422 being disposed other than perpendicular to the center of the subject's field of view may result in a nominally circular region exhibiting a footprint on the display 422 as may be more elliptical than circular, and a region defined as nominally 5 degrees from center may occupy a smaller or larger footprint on a display 422 depending on distance between eye and display 422.

As noted with regard to FIG. 3, correspondence between the first and second display regions 428 and 430 is maintained at step 350. Maintaining such correspondence at step 350 may be accomplished in various ways. However, in referring again to FIGS. 4A-C, it is noted that one such way for maintaining correspondence (though not necessarily the only such way) may be through use of eye tracking. As shown in FIGS. 4A-C, certain devices 420 may include an imager 426. While not all conceivable devices 420 necessarily do (nor must) include an imager 426, it may be suitable to image a subject with such an imager 426 when available, to determine factors such as distance between the subject's eyes and the display 422, the orientation of the device 420 (and thus typically also the orientation of the display 422), the particular location at which a given eye is aimed, etc. Such information may be useful in facilitating maintaining correspondence at step 350 in FIG. 3, and/or may be useful in various other steps as well (such as determining the central visual field at step 332, etc.). Use of an imager, and/or other sensors and sources of data, in support of carrying out method steps, is not limited.

With regard broadly to FIG. 1 through FIG. 4C, for the sake of simplicity certain descriptions and illustrations herein have been presented as addressing only one eye of a subject. This is not to exclude application of approaches herein from both eyes, whether independently or simultaneously. Addressing both eyes may be accomplished in a variety of ways.

For example, a given subject may have one eye that is dominant; in such cases (and/or in other cases where a dominant eye does not exist or is not identified), applying content for a single eye (e.g., the dominant eye) may be suitable also for the other eye. It is noted that while myopia that exists and/or progresses in only one eye but not both may not be entirely unknown, it may be that such cases are relatively rare. Thus, an approach of simply providing content tailored for one eye may be suitable in providing therapeutic benefit to both eyes.

As another example, it may be useful to determine and consider either two first and second display regions on a given display, and/or to reshape displays for a single eye to encompass suitable areas for both eyes. For example, typically (though not necessarily) central vision may exhibit a high degree of overlap between eyes, thus a nominally circular first display region for one eye may also function adequately for both eyes together. However, as peripheral vision may not closely overlap, two nominally annular second display regions may be overlapped and/or combined so as to present an appearance of a modified shape (e.g., an elongated, waisted ellipse).

Further, it is noted that such considerations as described immediately above may apply only to monocular displays, such as a single panel display on a smart phone, laptop computer, desktop monitor, etc. However, with a stereo arrangement (e.g., such as may be utilized for certain head mounted display devices) with individual displays for each eye, presenting content to both eyes is simply a matter of following steps similar to those in FIG. 3 twice, once for each eye.

In addition, with regard to the method as shown in FIG. 3, it is pointed out that while biasing away from myopia (or performing some other useful medical function) may be desirable, and may be a goal of such methods, biasing itself is not shown within the steps in FIG. 3. In the arrangement illustrated, stimuli are provided to an eye (e.g., in the form of the visual differential). Those stimuli then may bias the eye away from myopia, but the eye does what the eye does;

while specific biological processes may take place, it is not proposed that either a full understanding of all such biological processes as may be possible, nor a direct control of such processes, is necessarily a feature of the method itself. Determining suitable stimuli, and generating, delivering, and controlling such stimuli, may be accomplished within the scope of methods herein. No ownership or direct control of relevant biological processes themselves is asserted. An analogy may be drawn with exposing skin to ultraviolet light and tanning of the skin (though typically but not necessarily light as modified and/or applied herein may be more precisely analyzed and controlled than a simple ultraviolet lamp); application of that ultraviolet light may by carried out by a person according to a given procedure, but the skin will do what the skin will do (e.g., tans). Thus, even if biasing against myopia is a goal (and/or an outcome in practice), biasing against myopia is not presented as a discrete step herein.

Figure 5:
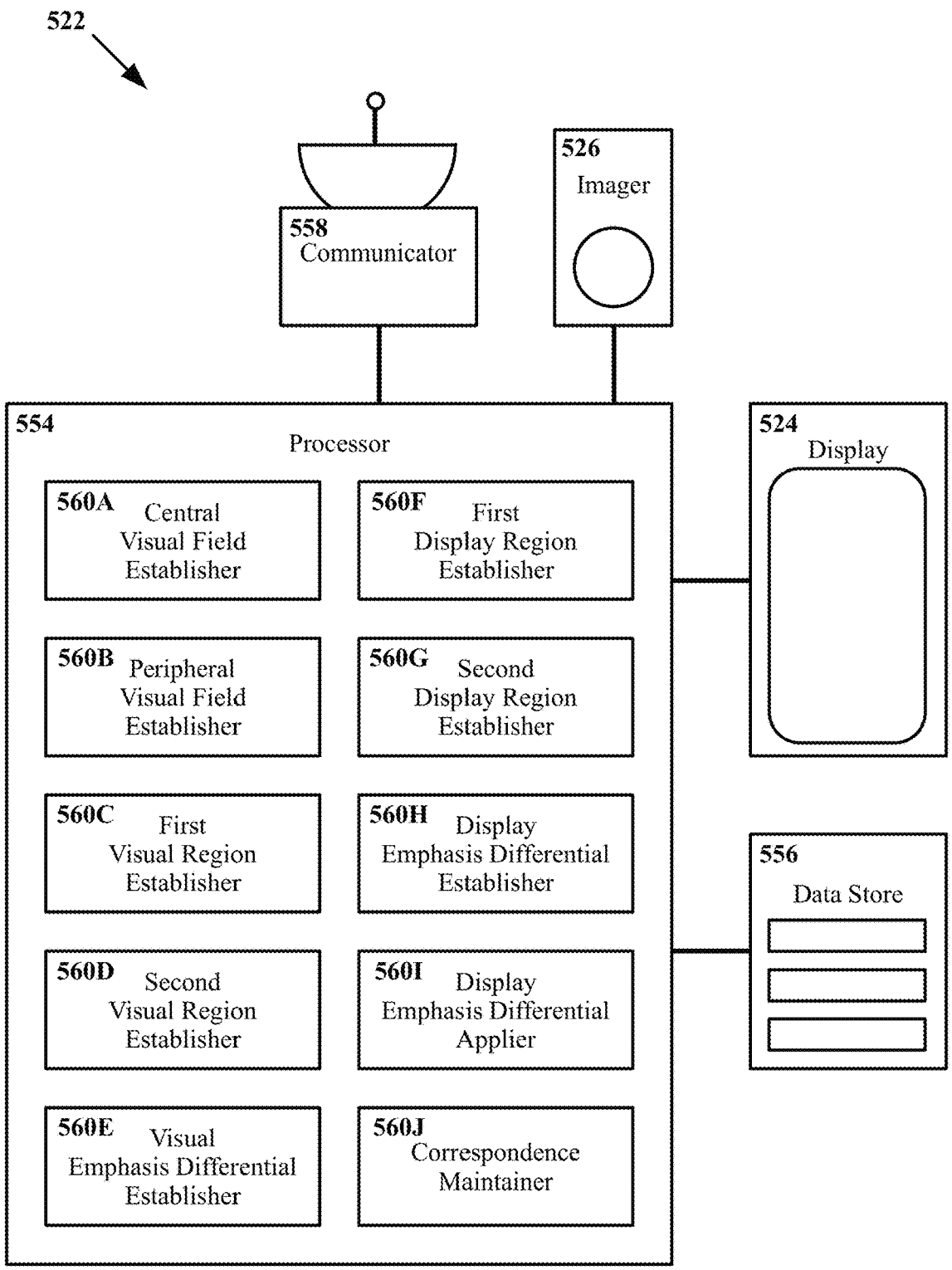
FIG. 5 shows an example apparatus for regional emphasis, in schematic form.

Turning now to FIG. 5, therein is shown an example illustration of an apparatus as may be suited for a regional emphasis approach. In FIG. 5, a device 522 may be seen. The device 522 may be a smart phone or similar as illustrated previously herein in FIG. 3, but other arrangements may also be suitable, including but not limited to a tablet, laptop computer, desktop computer, television, head mounted display unit, or other video display unit.

As also may be seen, the device 522 in FIG. 5 is engaged with a display 524. While the display 524 is illustrated as being directly connected with a remainder of the device 522, this is not required, nor is it required that the display 524 be integrated into the device 522 as such. While in certain instances it may be suitable for a display 524 to be integrated into a device 522, as with a smart phone, in other arrangements the display 524 may be separate, e.g., as a monitor that may be physically distinct from a desktop computer, or as a television that is not even physically connected with some other device (communicating for example through some wireless system, etc.). Other arrangements also may be suitable. It is noted that such provision for either integration or separation may also apply to any or all other elements shown in FIG. 5, as well. While for clarity the device 522 is shown as a single unit, this is an example only, and in practice it may be suitable to utilize discrete components without limitation.

Still with reference to FIG. 5, the device 522 also is shown to include an imager 526 such as a digital camera as may be present on smart phones, tablets, laptop computers, etc. (though a discrete imager 526 also may be suitable, as noted). The imager 526 is shown in FIG. 5 for illustrative purposes, but not all embodiments necessarily will or must include an imager 526. As noted previously, an imager 526 may be useful in performing certain functions such as identifying where a subject is looking, as may be relevant in determining dispositions of visual fields, visual regions, etc., but other arrangements also may be suitable. Similarly, other elements shown as examples in FIG. 5 may be excluded from certain embodiments, and/or additional elements may be part of certain embodiments, so long as functionality is maintained.

The device 522 as illustrated also includes a processor 554. The nature of the processor 554 is not limited, though typically (but not necessarily) a digital processor may be suitable. Also typically though not necessarily, the processor may include executable instructions disposed thereon.

The processor 554 is illustrated in FIG. 5 as having data entities 560A through 560J disposed thereon. The data entities 560A through 560J shown are adapted to perform various functions (as described subsequently), and may include executable instructions, stored information, etc. FIG. 5 shows the data entities 560A through 560J as distinct to individual functions, but in practice such data entities may be combined, subdivided, modified, etc., without limitation. For example, a single mobile device application may include some or all of data entities 560A through 560J incorporated therein, with instructions and data therein not necessarily readily distinguishable into discrete parts. So long as the relevant functionality may be accomplished, any number, form, etc. of data entities 560A through 560J may be suitable.

With regard to individual data entities 560A through 560J, as shown in FIG. 5, each data entity 560A through 560J represents a function at least somewhat similar to description previously presented herein (e.g., with regard to FIG. 3). The central visual field establisher 560A is adapted to determine a central visual field of a subject's eye, and the peripheral visual field establisher 560B is adapted to determine a peripheral visual field of the subject's eye. (As already noted, other elements, including but not limited to hardware elements, may be utilized in carrying out certain functions, such as an imager 0526. For example, the central visual field establisher 560A and/or peripheral visual field establisher 560B may carry out functions at least in part by controlling and/or receiving data from an imager 526. Although various data entities 560A through 560J are referred to herein as being adapted to perform various functions, such functions need not be performed "in a vacuum" with only the data entities 560A through 560J themselves; cooperation with other elements, whether data entities, hardware, etc., may be suitable.)

Still with reference to FIG. 5, the first visual region establisher 560C and second visual region establisher 560D are adapted to establish first and second visual regions, respectively (as described previously, typically portions of the visual field of the subject, more particularly though not necessarily including portions of the central and peripheral vision respectively). The visual emphasis differential establisher 560E is adapted to establish a visual emphasis differential. As described previously, the visual emphasis differential may be a desired and/or delivered differential applied to visual content as presented to the eye, so as to prompt a response that provides a bias against myopia (or performing some other useful function).

The first display region establisher 560F and second display region establisher 560G are adapted to establish first and second display regions, respectively. As previously described, such first and second display regions may be defined portions of the display 524 as may, at a given moment, correspond with first and second visual regions. The display emphasis differential establisher 560I is adapted to establish a display emphasis differential, e.g., as previously described, to provide for a difference to be applied to content in the first and second visual regions so as to yield a desired visual emphasis differential for the subject's eye.

The display emphasis differential applier 560I is adapted to apply the display emphasis differential to the first and second display regions, as established previously. Typically though not necessarily the display emphasis differential applier 560I may be adapted to engage with, communicate with, and/or control the display 524 to at least some degree. The correspondence maintainer 560J is adapted to maintain a correspondence between the first visual region and first display region and between the second visual region and second display region, respectively. As with the display emphasis differential applier 560I, the correspondence maintainer 560J may engage with, communicate with, and/or control the display 524 to at least some degree so as to maintain correspondence as the device 522 moves, as the subject's eyes shift alignment, etc.

The device 522 may also include a data store 556. The data store 556 may be adapted to accept, store, and deliver stored data and/or executable instructions, for example so as to support functions within the device 522 and in particular (though not necessarily) the data entities 560A through 560J. In addition or instead, the data store 556 also may be adapted to instantiate from storage the data entities 560A through 560J onto the processor 554, and/or to perform other functions such as recording data regarding the subject's behavior and eye condition, the particulars of the various regions and differentials, etc. Such information may be (but is not required to be) communicated to some external entity, such as a database, medical professional, the subject themself, etc.

The device 522 may also include a communicator 558, as may be adapted to send and/or receive information between the device 522 and one or more external entities. For example, as noted with regard to the data store 556 information may be communicated to a database, medical professional, etc. In addition, information may be received, such as software updates, new instructions for providing treatment to the subject, etc. Also, in particular it is noted that information may be communicated to other displays, or to the display 524 of the device 522 if (as described previously) the display 524 is not integral. Other communication also may be suitable.

Figure 6:
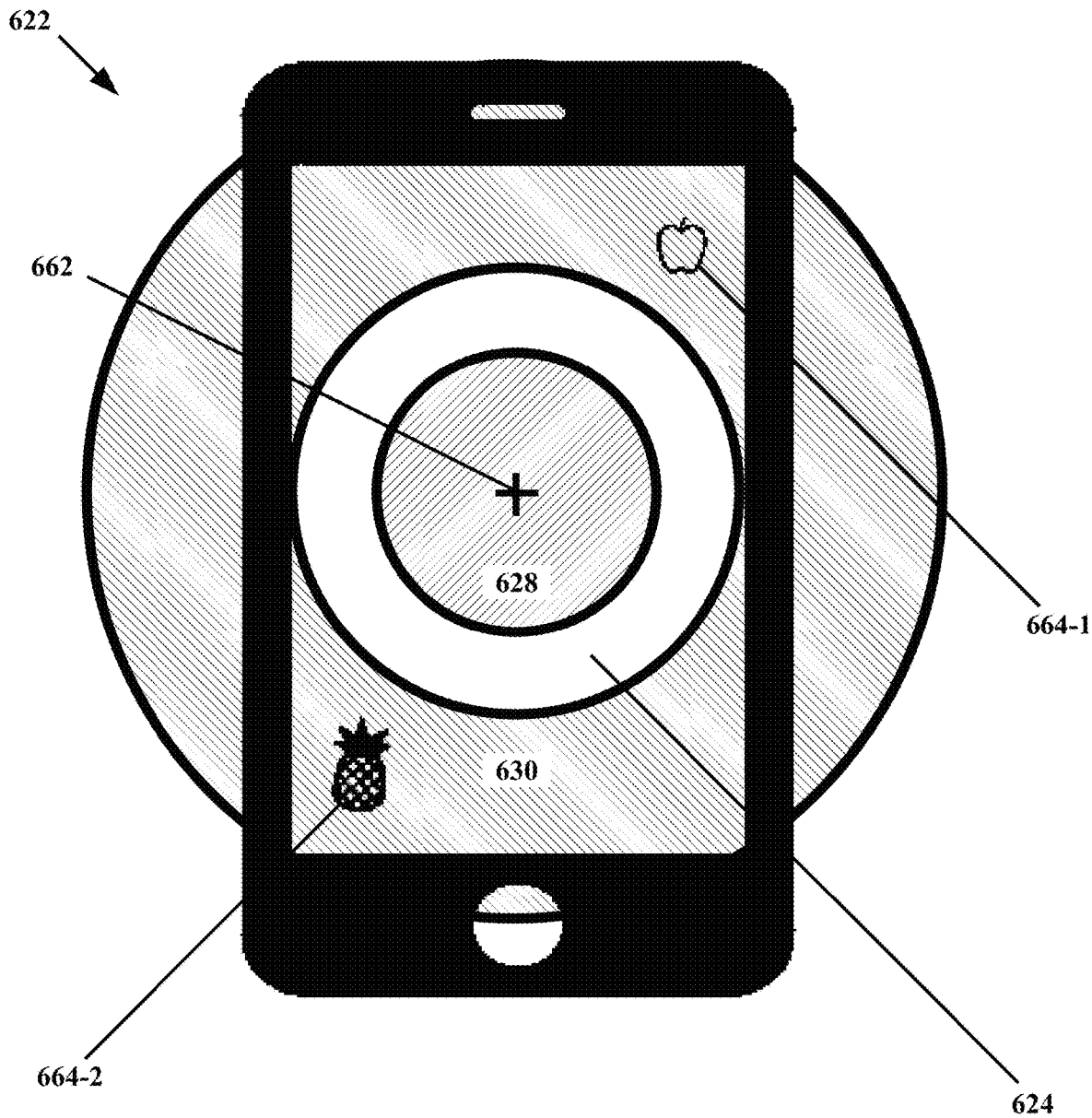
FIG. 6 shows an example apparatus for regional emphasis, exhibiting an example "gamified" approach thereto.

Now with reference to FIG. 6, as has been noted previously, in certain instances (including but not limited to a smartphone) the physical size of a given display may be small enough that parts of one or both of first and second display regions may not fit on the display itself. While not necessarily problematic, nevertheless it may be desirable in at least some instances to induce the subject to align their eyes in a manner as may be convenient for therapeutic benefit.

For instance, as shown in FIG. 6 a device 622 in the form of a smart phone (as an example only) is illustrated with first and second display regions 628 and 630 indicated with respect thereto. The first and second display regions 628 and 630 may be at least somewhat similar to those shown in FIGS. 4A-C, e.g., being at least approximately centered within the subject's visual field, the first display region 628 extending to approximately 5 degrees, the second display region 630 extending from approximately 8 to 15 degrees, etc. (For simplicity, visual field markings present in certain previous figures are not illustrated in FIG. 6).

The device 622 is shown with a display 624. In addition, several elements of visual content are illustrated as being presented by the display 624. An indicator mark 662 is shown in the form of a cross marking, at least approximately centered within the first display region 628. The indicator mark 662 may inform a viewer as to where to focus attention (and eyesight). In addition, first and second targets 664-1 and 664-2 are shown, in the form of fruit images, specifically an apple and a pineapple respectively.

An arrangement such as that presented in FIG. 6 thus may facilitate a "gamification" of certain approaches herein. That is, a subject focuses eyesight on an indicator mark 662, as may be conveniently positioned. With the indicator mark 662 in at least an approximate center of the first display region 628 (and given the particular arrangement of first display region 628 described with regard to FIG. 6 also at least in an approximate center of the central vision of the subject, if the subject maintains visual attention on the indicator mark 662), the first and second targets 664-1 and 664-2 are both disposed within the second display region 630 (and in the example case in FIG. 6, also in the peripheral vision of the subject).

In operation, targets such as the first and second targets 664-1 and 664-2 may appear in the second display region 630 (e.g., the peripheral vision) and move towards the first display region 628 (e.g., the central vision). A subject may be instructed to identify targets, for example as either being valid or invalid, e.g., fitting some game criterion or not. For example, a particular game might instruct a subject to distinguish apples from pineapples, or (though not illustrated) fruits from nuts, etc. To continue such an example, a subject may indicate that a valid target has appeared by blinking, clicking, voice input, etc. Clicking on a valid target may grant points, while clicking on invalid targets may lose points, etc. (Other arrangements may be suitable wherein success provides positive reinforcement and/or failure negative reinforcement, and the particulars thereof are not limited.) Targets may disappear or be judged as non-scoring if entering the first display region 628, so as to encourage the subject to identify targets with peripheral vision while still in the second display region 630.

While the game is being played, a display emphasis differential may be applied between the first and second display regions 628 and 630. Game functions may keep the visual field of the subject (and thus typically the first and second display regions 628 and 630) arranged conveniently for application of a visual emphasis differential to the subject. Thus, even a small screen, potentially configured inconveniently for biasing against myopia as described herein, may be utilized effectively. A variety of other approaches may produce similar effects, and such approaches are not limited.

It is noted that game duration need not necessarily be of long duration. Relatively short periods, e.g., on the order of some minutes, may be sufficient. Eyes may respond favorably to suitable stimuli without either constant or long-term application of stimulus (such as a visual emphasis differential). Thus, it may not be necessary to apply a display emphasis differential throughout normal use of a given device, nor even necessarily for long periods. (It should be understood that the potential utility of short periods may apply generally, not necessarily only to gamified approaches.) Occasional breaks from conventional display use, whether such breaks are gamified or not, may yield beneficial results.

In addition, it may be that certain such approaches, including but not limited to the gamified example presented above, may have benefits derived for example from the game, in addition to and/or besides benefits from a visual emphasis differential. For example, in requiring a subject to correctly identify targets in peripheral vision, as in the preceding example, and providing a mechanism therefor, the subject may in effect be undergoing training for improved peripheral vision sensitivity. Improved peripheral vision may have various benefits in practice, e.g., deriving from increased awareness of surroundings (with many potential applications). In addition, improving peripheral vision may in itself provide therapeutic benefit with regard to certain eye conditions, including but not limited to progressive myopia.

Figure 7:
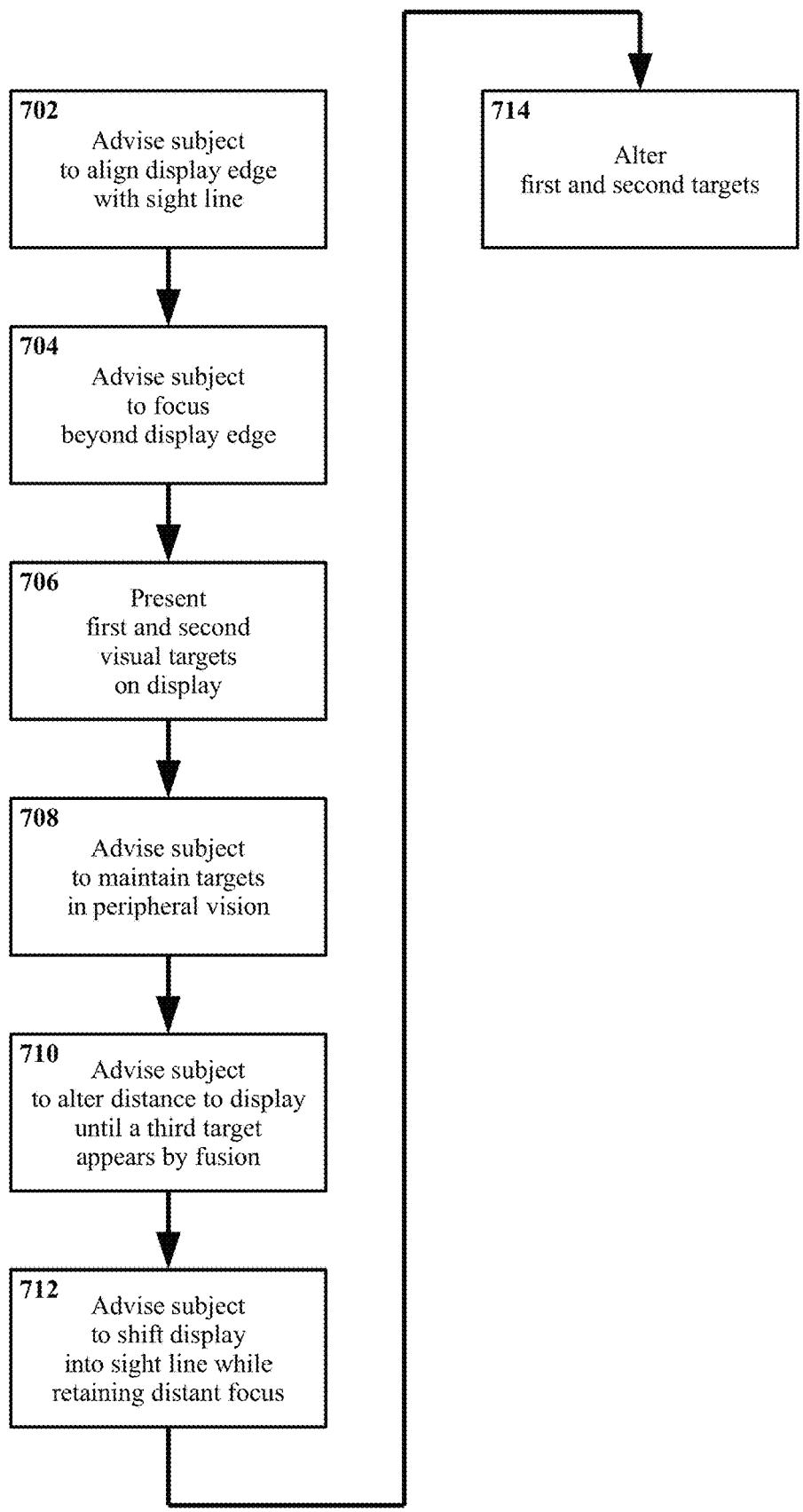
FIG. 7 shows an example method for visual fusion, in flowchart form.

Moving on to FIG. 7, and target fusion approaches, therein is shown an example method. It is noted that FIG. 8 illustrates certain steps as may graphically represent at least a portion of a method similar to that in FIG. 7, and reference may be made thereto in discussing FIG. 7.

In the method of FIG. 7, a subject is advised at step 702 to align an edge of a display, such as may be present on a smart phone, tablet, laptop computer, etc., with the sight line of the subject. Which edge of the display the subject aligns the sight line with is not limited, so long as there is room to display targets in at least one direction from the sight line once aligned. (Indeed, an arrangement wherein a subject looks through a transparent display, or through a gap within a display, between two displays, etc., also may be suitable.)

Also, in practice an exact alignment with the sight line (e.g., the center of the field of view) may not be necessary; approximate alignment with the central vision (or some portion thereof) of the subject may be suitable. For explanatory and illustrative purposes reference is made herein to a sight line, but other arrangements may be suitable. It is also noted that while the step 702 of advising the subject to align the edge may suggest the display is to be moved, it may be equally suitable for the subject to change position, orientation, etc., for the subject to shift eye alignment, etc.

With regard to advising the subject in step 702 and/or certain other steps herein, the precise manner by which the subject may be advised is not limited. Typically though not necessarily displays may be integrated into or engaged with a device, e.g., as may include a processor, speaker, etc., and/or some other mechanism(s) for delivering instructions to the subject. For example, a tablet may output spoken word instructions for the subject. To continue such an example, a tablet as may include an imager such as a digital camera also may collect information regarding what the subject may be doing, so as to facilitate proper timing of instructions (e.g., when to advise the subject to perform the next action), provide feedback as to whether the subject is performing actions as specified or should make adjustments, etc. While not necessary for all embodiments, such functionality is not excluded.

Continuing in FIG. 7, the subject is advised at step 704 to focus beyond the display edge, that is, to focus at some distance as may be greater than the physical distance between the subject and the display. In certain embodiments it may be preferable for the subject to focus "at infinity", but the precise distance at which to focus is not limited. (As an aside, in FIG. 8A an arrangement is shown wherein a subject has a sight line aligned approximately with an edge of a display. More regarding such an arrangement is presented subsequently herein with regard to FIG. 8A.)

Again referencing FIG. 7, first and second visual targets are presented on the display at step 706. The first and second targets are presented with some distance therebetween, and typically though not necessarily proximate but not directly at the edge of the display. Typically a separation between first and second targets of a few centimeters may be suitable, but this may vary considerably depending on individuals and conditions, and is not limited. The targets should be separated horizontally, that is, right and left targets, as certain effects as may be achieved may depend on an interaction of right and left eyes in producing binocular vision.

The subject is advised at step 708 to maintain the first and second targets in peripheral vision. Thus, the sight line (at least at this point) will not be aligned with the targets, but will be some distance away (e.g., at or beyond the edge of the display device, while the targets are on the display).

The subject is also advised at step 710 to adjust distance between eyes and display—while still maintaining a distant focus—until a third target appears to manifest between and/or partially overlapping the first and second targets. Typically such adjustment in distance may be gradual, though not all subjects may require such. (Again as an aside, in FIG. 8B an arrangement is shown wherein a third target manifests to the subject. However, as may be noted, the sight line in FIG. 8B is not at the edge of the display therein; thus the arrangement may correspond more closely with a subsequent step 0712 in FIG. 7 rather than with the currently discussed step 710. Reference to FIG. 8B is made at this point for illustrative purposes.)

Again with reference to FIG. 7, it is noted that the third target is a visual artifact; no third target is displayed. Rather, due to particular functions and structures of human vision, a fusion of the first and second targets may appear to the subject as a third target. In some sense the third target may be an illusion; while the third target may be visible to the subject, and thus in some sense the third target may exist within the eyes and/or brain of the subject, no such third target may exist in the outside world. Regarding particular conventions for describing such behavior, uncrossed disparity may be relevant to the apparent manifestation of such a third target. However, the precise manner by which the third target appears may not even be evident to the subject, and as noted for previous instances here, the eye does what the eye does. It may not be necessary for the subject to understand precisely what is going on within the eye, nor are such internal biological processes necessarily controlled directly herein. A stimulus is provided, as described herein, such that the third target may manifest. (Likewise, the subject behaviors and eye functions as may be responsible for manifesting the appearance of that third target may themselves be stimuli for beneficial effects on the eyes, as may for example bias against myopia.) Thus, particulars of how the target may manifest are not addressed herein.

Continuing in FIG. 7, the subject is advised at step 712 to shift the display into the sight line (and/or shift the sight line into alignment with the display, etc.), or at least closer into alignment with the first and second targets, while retaining a distant focus (e.g., maintaining the accommodation of the eyes for a distant point, even though the point immediately in front of the eyes may now be the display at a much shorter real world distance). Typically, such adjustment in alignment may be gradual, though not all subjects may require such. Some effort may be required on the part of the subject to avoid focusing on the display itself; focusing on the display may cause the third target to cease to be visible to the subject. Likewise, some degree of practice by the subject may be useful in learning to maintain the visibility of the third target. However, such effort and/or practice is not necessarily a drawback and may indeed be desirable, as such effort and/or practice may in itself be useful in stimulating the desired response, e.g., biasing against progressive myopia (and/or other beneficial outcomes, including but not limited to improving peripheral vision).

Continuing in FIG. 714, the first and second targets may be altered in some fashion. Such alteration at step 714 may be optional, and is not necessarily required for all embodiments. Altering the first and second targets at step 714 may increase the difficulty of maintaining the fusion (by the visual processes of the subject) of the first and second targets into the third target. As noted previously with regard to effort and/or practice, increasing difficulty in fusing the third target into visibility from the first and second targets may in itself be therapeutically useful, e.g., in biasing against progressive myopia.

The form and degree of alteration at step 714 may vary considerably, and individuals may differ in responsiveness thereto (and different displays may exhibit different capabilities in producing such alterations); thus, the alterations themselves are not limited. However, for example purposes, forms of alteration at step 714 may include varying the distance between the first and second targets. Typically though not necessarily, at a given distance from the subject a larger separation between the first and second targets may increase the difficulty in fusing the third target. Conversely however, if the subject is experiencing difficulty in fusing the third target, the separation between first and second targets may be reduced so as to assist the subject in more easily fusing the third target. Thus, altering the first and second targets at step 714 does not necessarily imply that difficulty is increased.

Forms of alteration at step 714 may include changes to the size of the first and/or second targets. Typically though not necessarily, fusing smaller first and second targets, and/or fusing targets of mismatched size, may present increased difficulty in fusing the third target. It is noted that the first and/or second targets need not be changed in size together, e.g., one of the first and second targets may be enlarged or reduced in size while the other of the first and second targets may be held constant, changed in opposition (e.g., the first target is enlarged while the second is reduced), etc. It should be understood similarly that other alterations to the first and second targets at step 714 likewise need not be uniform for both the first and second targets, and non-uniform alterations at step 714 may be useful.

Forms of alteration at step 714 may include color, such as changing the color of the first and second targets, changing one of the first and second targets, changing the background, etc. Forms of alteration at step 714 may include changing the shape and/or the orientation of one or both of the first and second targets. Forms of alteration at step 714 also may include animating one or both of the first and second targets, either as graphical objects (e.g., two portions of a swimming fish adapted to fuse into a complete fish as a third target), or as dynamic changes in other properties (e.g., cycling through different colors), or in some other form. In addition, forms of alteration at step 714 may include modifying the content of the first and/or second targets so as to change the specific form (if any) of the fused third target, for example in changing a first target from a front end of a fish to a top portion of a human while leaving the second target as the back end of a fish such that a fused third target would be a mermaid rather than a fish. Other arrangements also may be suitable.

In addition, alteration at step 714 may include any or all of the various emphasis parameters previously described with regard to regional emphasis, including but not limited to brightness, contrast, saturation, resolution, tint, display refresh rate, video frame rate, animation speed, focus, sharpness, and diffusion. Other alterations at step 714 also may be suitable.

As has been noted, altering the first and second targets at step 714 may be optional in at least certain embodiments. Similarly, certain other steps regarding advising the subject may be at least somewhat optional, e.g., as not necessarily being repeated in every instance (for example in expecting that the subject may come to know what to do after some repetition). Additional steps likewise are not prohibited.

Figure 8A:
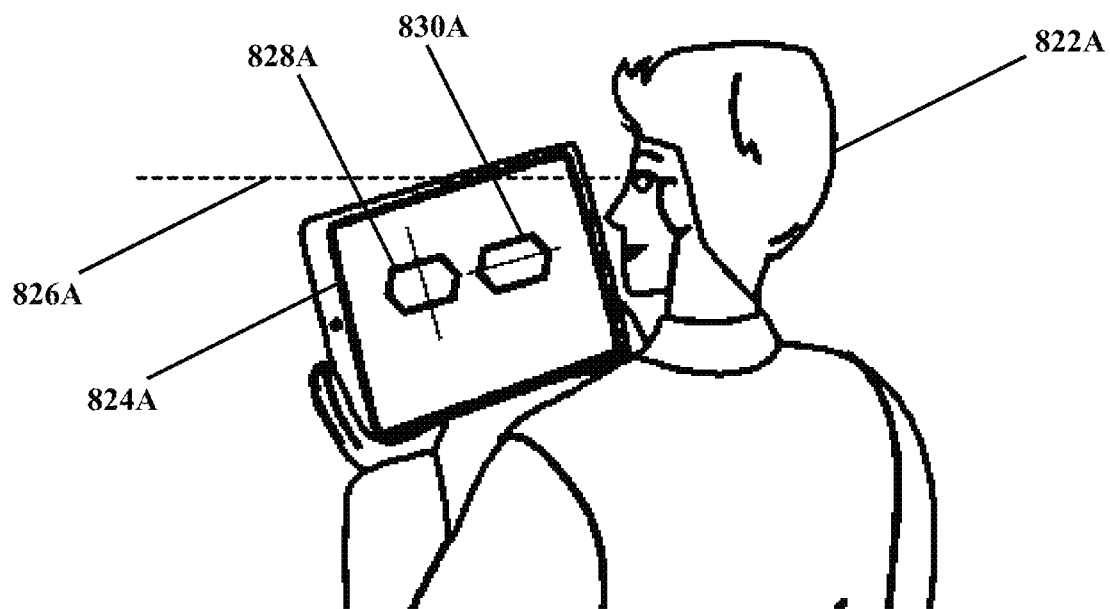
FIG. 8A and FIG. 8B show example perspective views of aspects of an example method for visual fusion.
Figure 8B:
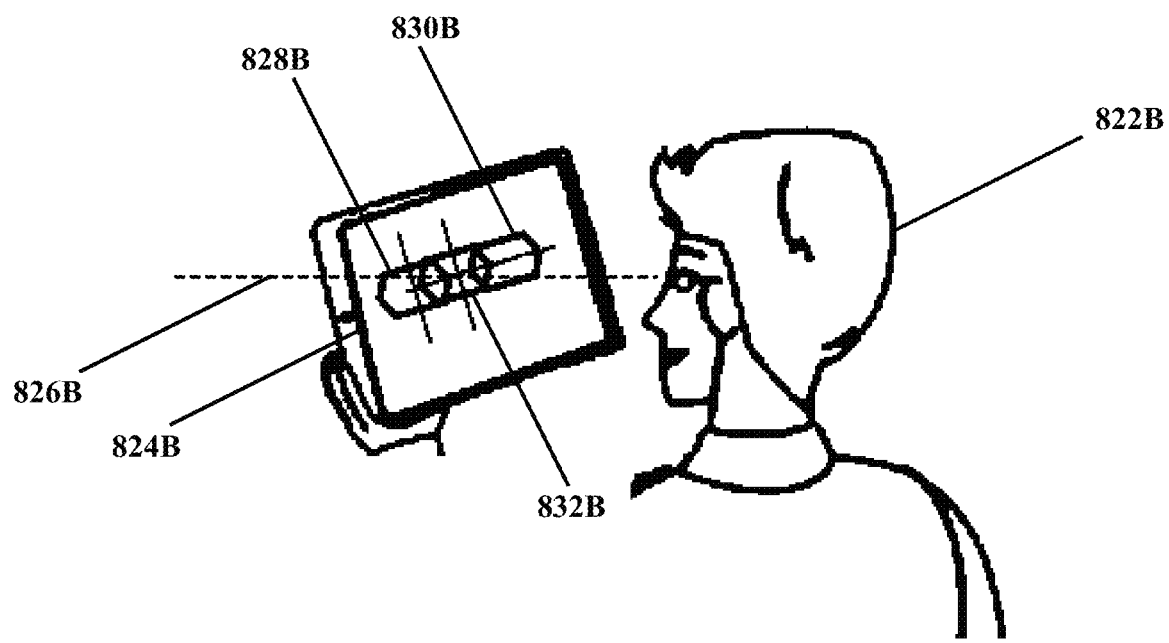

Now with reference to FIG. 8A and FIG. 8B collectively, therein are shown to illustrative views as may be understood to correspond with certain portions of the method as shown in FIG. 7. More particularly, FIG. 8A may be understood to correspond with step 706 in FIG. 7, and/or FIG. 8B may be understood to correspond with step 712 in FIG. 7. The illustrations thereof should not be taken as limiting, and are examples only. In particular, although sight lines, etc. may be illustrated with regard to a top edge of a display, this does not necessarily exclude arrangements addressing the bottom edge, etc.

With regard specifically to FIG. 8A, a subject 822A is shown with a device as may be similar to a tablet computer (not uniquely numbered) having a display 824A thereon. As may be seen a sight line 826A of the subject 822A is depicted as aligned at least approximately with an edge of the display 824A. In addition, first and second targets 828A and 830A are shown being presented on the display 824A. As may be observed, the first and second targets 828A and 830A are a distance apart from one another, and are positioned so as may be within the peripheral vision of the subject 822A but not the central vision of the subject 822A. As may also be seen, the first and second targets 828A and 830A are both approximately hexagonal in shape, but each exhibits a unique feature, wherein the first target 828A includes a vertical line not present in the second target 830A while the second target 830A includes a horizontal line not present in the first target 828A. The arrangement shown in FIG. 8A may correspond with a point at which the subject 822A has focused beyond the display 824A but has not yet fused the first and second targets 828A and 830A.

Moving on to FIG. 8B, a subject 822B is again shown with a device having a display 824B thereon. The sight line 826B of the subject 822B is depicted as aligned at least approximately with a point on the display 824B and between first and second targets 828B and 830B.

In addition, a third target 832B may be seen between and at least partially overlapping the first and second targets 828B and 830B. As may be observed, the third target 832B exhibits features of both the first and second targets 828B and 830B, being at least approximately hexagonal but also including both the vertical line in the first target 828B and the horizontal line in the second target 830B.

As previously indicated, it should be understood that the third target 832B may be considered in at least some sense to be an illusion; an individual viewing the scene in FIG. 8B from the point of view by which FIG. 8B is illustrated may not observe any such third target 832B. The subject 822B may see the third target 832B, but another observer nearby looking at the display 824B may not. It is not required for the third target 832B to be literally present on the display 824B, as the third target 832B may be an artifact of the visual processes of the subject 822B at a given position, a given focus, etc. Thus, concerns as to whether the third target 832B is or is not "real" are essentially moot, so long as the physiological processes as may produce the appearance of the third target 832B to the subject 822B are stimulated.

Although a detailed analysis of such physiological processes may not be relevant to the effectiveness of fusing the third target 832B as shown (e.g., so as to bias against progressive myopia), some discussion thereof may be illuminating. In focusing at a distant point, the subject's eyes shift the focus of the lenses thereof, changing the shape of the lens, changing tension levels and/or positions of structures as control the focus of the lens (e.g., compressing the lens to change the shape and focal length thereof). Likewise, the eyes may orient in slightly different directions so as to both point towards a distant target (whether or not that distant target is real also may be moot, merely "staring at infinity" with no real world target may suffice as the target itself typically is of less importance than the internal processes of the eyes); the individual sight lines of the eyes tend to be directed slightly inward (e.g., towards a center point between the eyes) for observing close objects, less so for more distant objects. Either or both such changes, and/or changes as may occur therewith (whether as direct consequences or not) such as potential pupil dilation, etc., may provide stimuli within the eyes as may result in a bias against progressive myopia.

Similarly, as with regard to regional emphasis approaches, natural physiological processes are not asserted to be directly modified herein. Rather, stimuli may be applied to the eyes as may have beneficial consequences, even if the precise manner(s) by which the eyes themselves react so as to produce such consequences (e.g., a bias against progressive myopia) are not fully understood. In particular, an understanding of such may not be required by subjects, nor must information on such processes necessarily be present within a system for applying suitable stimuli (though the presence of, and/or responsiveness to, such physiological processes also is not prohibited).

Figure 9:
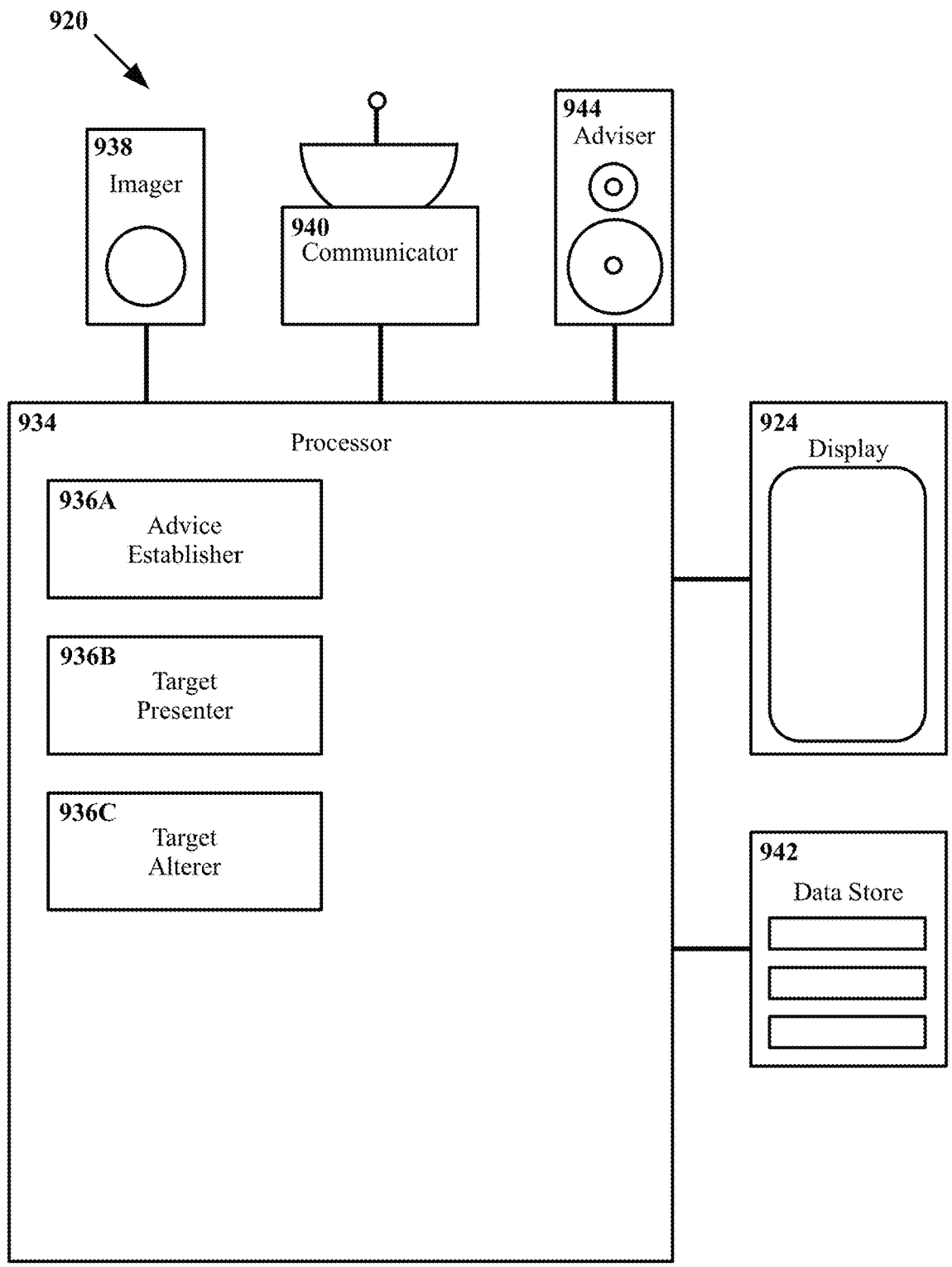
FIG. 9 shows an example apparatus for visual fusion, in schematic form.

Turning to FIG. 9, therein is shown an example illustration of an apparatus as may be suited for a visual fusion approach. In FIG. 9, a device 920 may be seen. The device 920 may be a tablet computer or similar as illustrated previously in FIG. 8A and FIG. 8B, but other arrangements may also be suitable, including but not limited to a smart phone, laptop computer, desktop computer, television, head mounted display unit, or other video display unit.

As also may be seen, the device 920 in FIG. 9 is engaged with a display 924. While the display 924 is illustrated as being directly connected with a remainder of the device 920, this is not required, nor is it required that the display 924 be integrated into the device 920 as such. While in certain instances it may be suitable for a display 924 to be integrated into a device 920, as with a tablet computer, in other arrangements the display 924 may be separate, e.g., as a monitor that may be physically distinct from a desktop computer, or as a television that is not even physically connected with some other device (communicating for example through some wireless system, etc.). Other arrangements also may be suitable. It is noted that such provision for either integration or separation may also apply to any or all other elements shown in FIG. 9, as well. While for clarity the device 920 is shown as a single unit, this is an example only, and in practice it may be suitable to utilize discrete components without limitation.

Still with reference to FIG. 9, the device 920 also is shown to include an imager 938 such as a digital camera as may be present on smart phones, tablets, laptop computers, etc. (though a discrete imager 938 also may be suitable, as noted). The imager 938 is shown in FIG. 9 for illustrative purposes, but not all embodiments necessarily will or must include an imager 938. An imager 938 may be useful in performing certain functions such as identifying where a subject is looking, as may be relevant in providing feedback to a subject, etc., but other arrangements also may be suitable. Similarly, other elements shown as examples in FIG. 9 may be excluded from certain embodiments, and/or additional elements may be part of certain embodiments, so long as functionality is maintained.

The device 920 as illustrated also includes a processor 934. The nature of the processor 934 is not limited, though typically (but not necessarily) a digital processor may be suitable. Also typically though not necessarily, the processor may include executable instructions disposed thereon.

The processor 934 is illustrated in FIG. 9 as having data entities 936A through 936C disposed thereon. The data entities 936A through 936C shown are adapted to perform various functions (as described subsequently), and may include executable instructions, stored information, etc. FIG. 9 shows the data entities 936A through 936C as at least somewhat distinct to certain individual functions, but in practice such data entities may be combined, subdivided, modified, etc., without limitation. For example, a single mobile device application may include some or all of data entities 936A through 936C incorporated therein, with instructions and data therein not necessarily readily distinguishable into discrete parts. So long as the relevant functionality may be accomplished, any number, form, etc. of data entities 936A through 936C may be suitable.

With regard to individual data entities 936A through 936C, as shown in FIG. 9 each data entity 936A through 936C represents a function, as may be at least somewhat similar to description previously presented herein (e.g., with regard to FIG. 7).

The advice establisher 936A is adapted to establish advice for the subject, e.g., as to how to position the device 920, where the subject should position a sight line, etc. As already noted, other elements, including but not limited to hardware elements, may be utilized in carrying out certain functions, such as an imager 938. For example, the advice establisher 936A may carry out functions at least in part by controlling and/or receiving data from an imager 938, may provide information to the adviser 944 for communication to the subject, etc. Although various data entities 936A through 936C are referred to herein as being adapted to perform various functions, such functions need not be performed "in a vacuum" with only the data entities 936A through 936C themselves; cooperation with other elements, whether data entities, hardware, etc., may be suitable.

Still with reference to FIG. 9, the target presenter 936B is adapted to present first and second targets to the subject via the display 924. (It is noted that the third target, while in some sense being presented to the subject by way of the first and second targets being fused by the subject within eyes and/or brain, is not literally delivered to or output from the display 924.)

The target alterer 936C is adapted to alter the first and second targets (and thus likewise, at least partially and/or indirectly, the fusion producing the third target). As noted the forms of alteration may be extremely varied, and likewise specific functions to be carried out by the target alterer 936C may be very broad ranging.

The device 920 may also include a data store 942. The data store 942 may be adapted to accept, store, and deliver stored data and/or executable instructions, for example so as to support functions within the device 920 and in particular (though not necessarily) the data entities 936A through 936C. In addition or instead, the data store 942 also may be adapted to instantiate from storage the data entities 936A through 936C onto the processor 934, and/or to perform other functions such as recording data regarding the subject's behavior and eye condition, the performance of the subject with regard to when, for how long, with what degree of success the subject has used the device 920, etc. Such information may be (but is not required to be) communicated to some external entity, such as a database, medical professional, the subject themself, etc.

The device 920 may also include a communicator 940, as may be adapted to send and/or receive information between the device 920 and one or more external entities. For example, as noted with regard to the data store 942 information may be communicated to a database, medical professional, etc. In addition, information may be received, such as software updates, new instructions for providing treatment to the subject, etc. Also, in particular it is noted that information may be communicated to other displays, or to the display 924 of the device 920 if (as described previously) the display 924 is not integral. Other communication also may be suitable.

Figure 10:
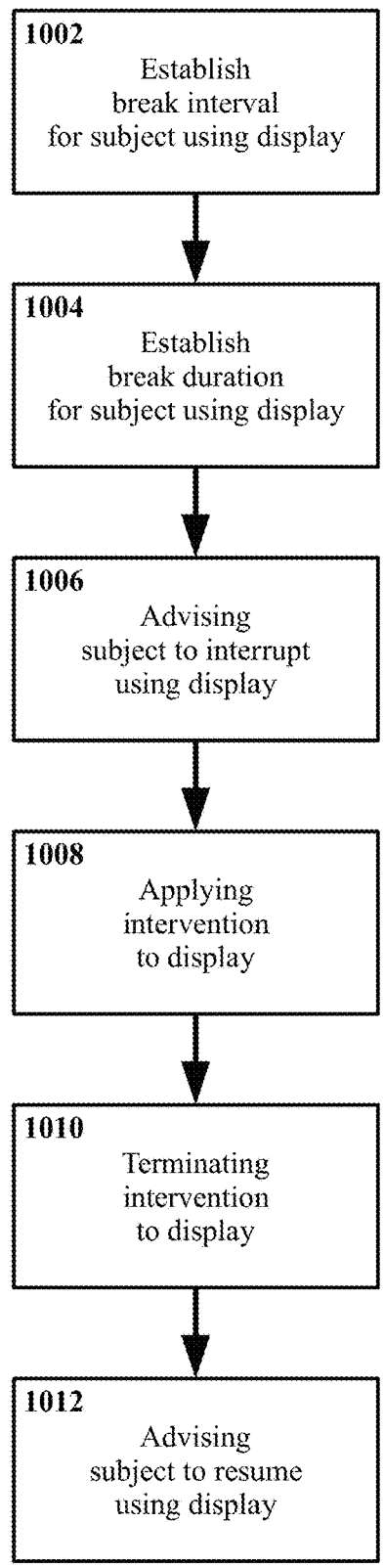
FIG. 10 shows an example method for adaptive break, in flowchart form.

Moving now to FIG. 10, and with regard to adaptive break approaches, a method for an adaptive break is presented therein in flowchart form. In FIG. 10, a break interval is established at step 1002 for a subject who is using a display. (As previously described, establishing with regard to FIG. 10 and elsewhere herein is to be understood broadly, and may include but is not limited to making use of a fixed interval, calculating an interval based on usage, determining an interval for a specific subject, etc.) A break duration is also established at step 1004 for the subject using the display.

While steps 1002 and 1004 refer to a subject, it should not be assumed that break intervals and/or break durations necessarily may be specific to an individual (although such also is not prohibited, and may in certain instances be useful). It may be suitable to set break intervals and/or durations based on the display in question, based on environmental conditions, based on display usage (e.g., what is being done, what content is being displayed, etc.), on predetermined and/or fixed estimates of effective values, etc., in addition to and/or instead of being tailored to an individual subject or a group of subjects.

However, gathering information regarding a given subject, group of subjects, environment, device, device usage, etc., and/or using such information to inform adaptation of break intervals, durations, and/or other features (e.g., the particular form of the break, how the device responds, if at all, during the break, etc.) may be useful.

Continuing in FIG. 10, responsive to the break interval being completed (e.g., the passage of a designated period of time, satisfaction of requirements as may inform or modify establishing the break interval at step 1002, etc.), the subject using the display is advised at step 1006 to interrupt use of the display. The manner of advising is not limited, but may for example include messages and/or images presented by the display itself, audio signals including but not limited to spoken word messages, etc.

An intervention is then applied to the display at step 1008. The nature of the intervention may vary, but ideally may be adapted to provide rest to the subject so as to apply a bias against progressive myopia (e.g., as may result directly or indirectly, partially or entirely, from use of such displays).

For example, the intervention applied at step 1008 may include deactivating the display so as to prevent use of graphical features of the display device. However, such deactivation (whether blanking a screen, blurring out a screen, presenting a timer countdown, etc.) is not necessarily required to prevent ongoing functions as may otherwise be related to the display. For example, text data may be presented through an audio output rather than graphically, by use of text to speech functionality. As another example, descriptive AI systems may interpret content as otherwise may be presented as graphical information in some other form, such as by providing descriptions of images, animations, charts, and/or other data. It is noted that AI based systems may facilitate generation of graphics from text description; it is proposed herein to carry out a reversal of such a process, e.g., describing an image in text (perhaps as spoken word audio) rather than generating an image from text.

In addition and/or instead, while the intervention is being applied at step 1008 other actions may be carried out. For example, therapeutic activities, including but not limited to certain approaches as may reflect regional emphasis and/or visual fusion, may be presented graphically. Such therapeutic activities may be conducted in parallel with AI based text description (or other information conversion to some form other than graphical), instead of such description, etc.

Further, use of AI may not be limited only to activities carried out during a break, e.g., to presenting audio text description of graphical content. For example, an AI based decision support tool may be applied to inform and/or determine (at least in part) aspects such as the break interval, break duration, recommended activities during the break, etc. While AI based decision support is not necessarily required, neither is such prohibited, and certain embodiments may engage with an AI based decision support tool in at least some fashion.

Regardless of the nature of the intervention applied at step 1008, responsive to the break duration being satisfied, the intervention is terminated at step 1010. Graphical response for the display thus may, for example, be returned to a default from before the intervention was applied at step 1008. As with the break interval, the break duration may be fixed, predetermined, etc., and/or may be variable, adaptive, etc. For example, break duration may be adjusted based on the particular subject, environment, display properties, content displayed, etc. In addition, subject actions during the break may be considered in adjusting the break duration. For example, if some therapeutic activity is performed by the subject, successful/unsuccessful performance may be considered in determining how long the break duration should be. (As a more concrete example, extremely poor performance may suggest a need for longer, and/or more frequent, breaks, thus at least potentially informing the break duration and/or the break interval as well.)

Intervention also may include additional factors, e.g., not related directly to the display itself. For example, in advising the subject to interrupt use of the display at step 1006, the subject also may be advised to remove glasses, change lighting, shift line of sight (e.g., to some distant point), etc.

No illustration is provided herein for display functionality during breaks. As intervention typically (though not necessarily) may include an interruption of normal graphical display functions, and/or an interruption of any graphical display functions at all, illustration of such status may not be illuminating. Thus, no attempt is made herein to show a display that is, for example, turned off as an intervention thereto.

Still with reference to FIG. 10, upon terminating intervention to the display at step 1010, the subject may be advised at step 1012 that normal (e.g., as without and/or prior to intervention) may resume. Alternately, as with step 1006, typical graphical display functions may simply resume without overt notification.

Figure 11:
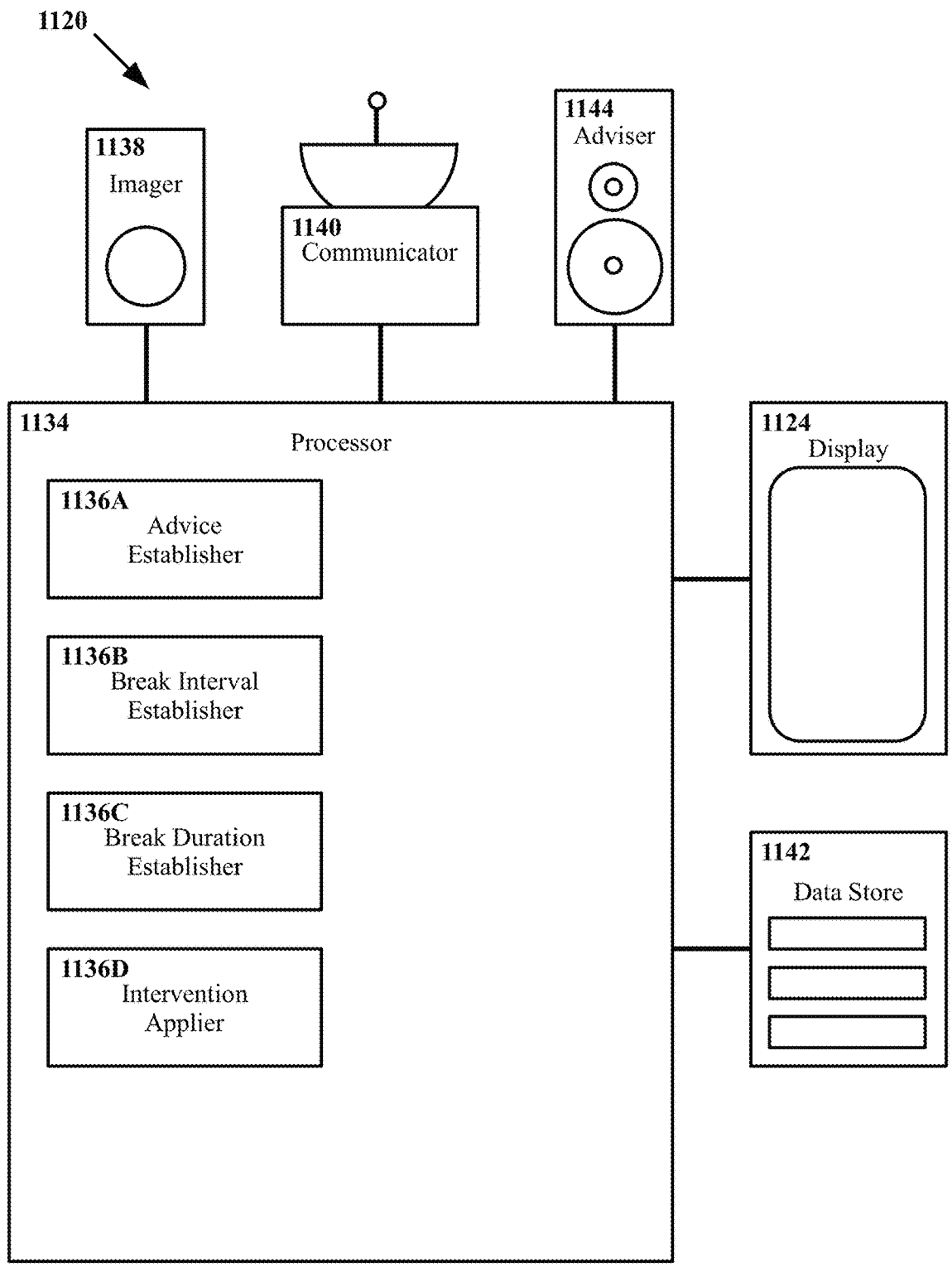
FIG. 11 shows an example apparatus for adaptive break, in schematic form.

Now with reference to FIG. 11, therein is shown an example illustration of an apparatus as may be suited for an adaptive break. In FIG. 11, a device 1120 may be seen. The device 1120 may be a smart phone, tablet computer, laptop computer, desktop computer, television, head mounted display unit, television, or other video display unit, without limitation.

As also may be seen, the device 1120 in FIG. 11 is engaged with a display 1124. While the display 1124 is illustrated as being directly connected with a remainder of the device 1120, this is not required, nor is it required that the display 1124 be integrated into the device 1120 as such. While in certain instances it may be suitable for a display 1124 to be integrated into a device 1120, as with a tablet computer, in other arrangements the display 1124 may be separate, e.g., as a monitor that may be physically distinct from a desktop computer, or as a television that is not even physically connected with some other device (communicating for example through some wireless system, etc.). Other arrangements also may be suitable. It is noted that such provision for either integration or separation may also apply to any or all other elements shown in FIG. 11, as well. While for clarity the device 1120 is shown as a single unit, this is an example only, and in practice it may be suitable to utilize discrete components without limitation.

Still with reference to FIG. 11, the device 1120 also is shown to include an imager 1138 such as a digital camera as may be present on smart phones, tablets, laptop computers, etc. (though a discrete imager 1138 also may be suitable, as noted). The imager 1138 is shown in FIG. 11 for illustrative purposes, but not all embodiments necessarily will or must include an imager 1138. An imager 1138 may be useful in performing certain functions, but other arrangements also may be suitable. Similarly, other elements shown as examples in FIG. 11 may be excluded from certain embodiments, and/or additional elements may be part of certain embodiments, so long as functionality is maintained.

The device 1120 as illustrated also includes a processor 1134. The nature of the processor 1134 is not limited, though typically (but not necessarily) a digital processor may be suitable. Also typically though not necessarily, the processor may include executable instructions disposed thereon.

The processor 1134 is illustrated in FIG. 11 as having data entities 1136A through 1136D disposed thereon. The data entities 1136A through 1136D shown are adapted to perform various functions (as described subsequently), and may include executable instructions, stored information, etc. FIG. 11 shows the data entities 1136A through 1136D as at least somewhat distinct to certain individual functions, but in practice such data entities may be combined, subdivided, modified, etc., without limitation. For example, a single mobile device application may include some or all of data entities 1136A through 1136D incorporated therein, with instructions and data therein not necessarily readily distinguishable into discrete parts. So long as the relevant functionality may be accomplished, any number, form, etc. of data entities 1136A through 1136D may be suitable.

With regard to individual data entities 1136A through 1136D, as shown in FIG. 11 each data entity 1136A through 1136D represents at least one function, as may be at least somewhat similar to description previously presented herein (e.g., with regard to FIG. 10).

The advice establisher 1136A is adapted to establish advice for the subject, e.g., as to when to take a break from use of the device 1120, etc. As already noted, other elements, including but not limited to hardware elements, may be utilized in carrying out certain functions, such as an imager 1138. For example, the advice establisher 1136A may carry out functions at least in part by controlling and/or receiving data from the imager 1138, may provide information to the adviser 1144 for communication to the subject (such as text descriptions), etc. Although various data entities 1136A through 1136D are referred to herein as being adapted to perform various functions, such functions need not be performed "in a vacuum" with only the data entities 1136A through 1136D themselves; cooperation with other elements, whether data entities, hardware, etc., may be suitable.

Still with reference to FIG. 11, the break interval establisher 1136B is adapted to establish an interval indicating at what time a break may be advised and/or an intervention applied. The break duration establisher 1136C similarly is adapted to establish a duration for a break and/or an intervention. As noted, establishing the break interval and/or break duration may be simple (e.g., predetermined fixed intervals and durations) and/or extremely complex (e.g., dependent on many factors as may be informed by an AI decision support tool); consequently the break interval establisher 1136B and the break duration establisher 1136C likewise may be simple or complex (and/or may have variable settings so as to operate in multiple modes of complexity, etc., as may also be true of other data entities herein).

Still with reference to FIG. 11, the intervention applier 1136D is adapted to apply an intervention to the device 1120, typically though not necessarily affecting at least the display 1124 thereof, though at least potentially affecting other systems such as the adviser 1144 so as to deliver audio descriptions, provide sound during therapeutic activities, play music while the intervention is in progress, etc. As with the break interval establisher 1136B and break duration establisher 1136C the intervention applier 1136D may be simple or complex, depending on the particulars of the intervention(s) for a given embodiment. For example, merely deactivating graphical functions of the display 1124 may be relatively simple, while supporting AI based spoken text descriptions of graphical content may be complex. Variable complexity options also are not excluded.

The device 1120 may also include a data store 1142. The data store 1142 may be adapted to accept, store, and deliver stored data and/or executable instructions, for example so as to support functions within the device 1120 and in particular (though not necessarily) the data entities 1136A through 1136D. In addition or instead, the data store 1142 also may be adapted to instantiate from storage the data entities 1136A through 1136D onto the processor 1134, and/or to perform other functions such as recording data regarding the particular break activities, the subject's performance at such (assuming activities are such as to be evaluated, e.g., simply turning the screen off may not facilitate collection of subject performance data), etc. Such information may be (but is not required to be) communicated to some external entity, such as a database, medical professional, the subject themself, etc.

The device 1120 may also include a communicator 1140, as may be adapted to send and/or receive information between the device 1120 and one or more external entities. For example, as noted with regard to the data store 1142 information may be communicated to a database, medical professional, etc. In addition, information may be received, such as software updates, new instructions for providing treatment to the subject, etc. Also, in particular it is noted that information may be communicated to other displays, or to the display 1124 of the device 1120 if (as described previously) the display 1124 is not integral. Other communication also may be suitable.

Figure 12:
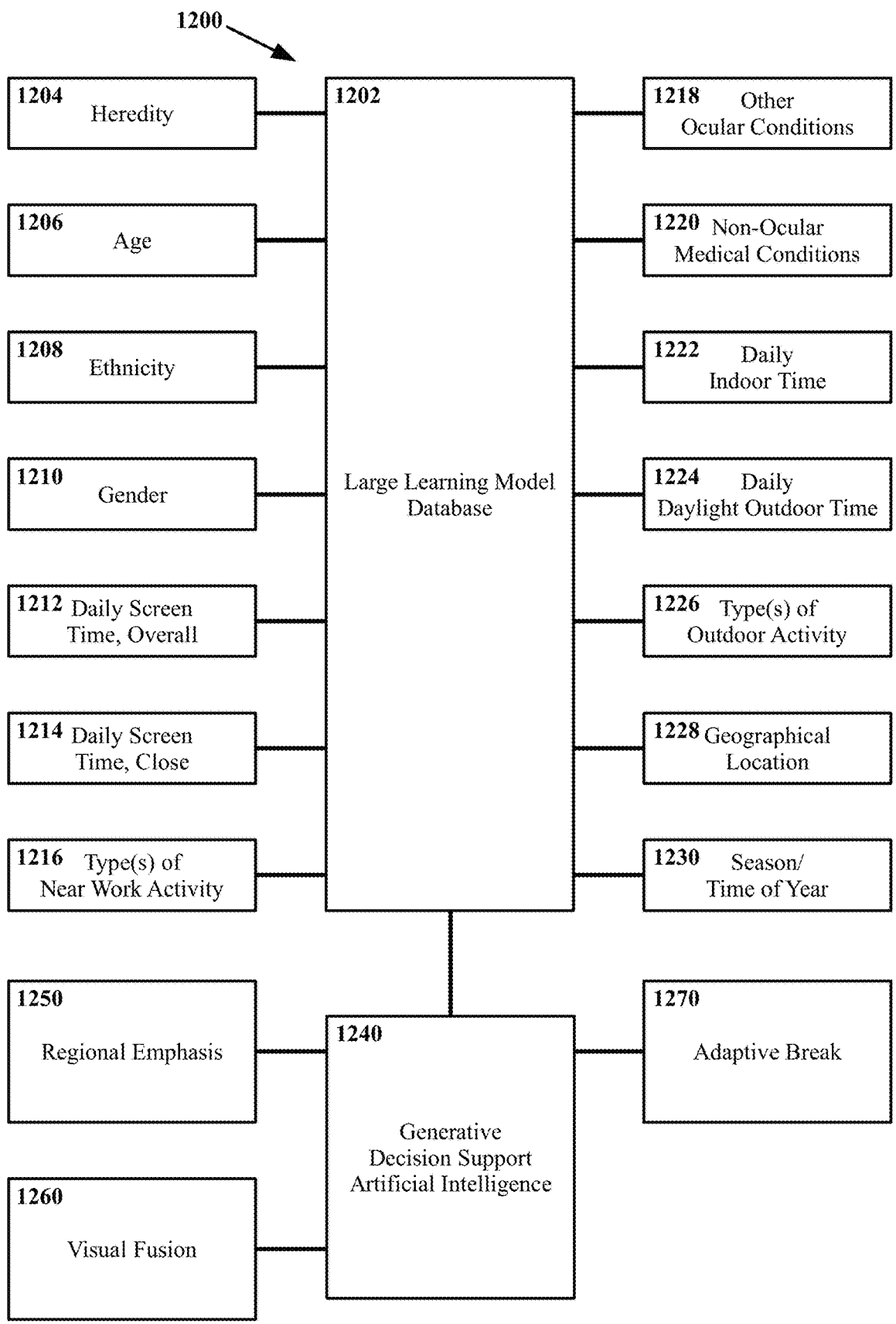
FIG. 12 shows an example arrangement for an artificial intelligence based decision support tool, in schematic form.

Now with reference to FIG. 12, and with regard to decision support approaches herein, as described previously herein certain eye conditions, risks associated therewith, diagnosis for such, treatment thereof, etc., may be affected by a larger number of potential factors. Moreover, at least certain such factors may interrelate, rather than being independent of one another. Evaluating such complex, multi-dimensional problems may present considerable difficulties even for highly trained medical personnel. FIG. 12 thus illustrates an example arrangement, in schematic form, of an arrangement for supporting medical considerations using an AI based decision support tool 1200. It is noted that diagramming thereof may be unavoidably abstracted to at least some extent, e.g., with various types of data illustrated collectively based on category rather than individual facts and/or interrelationships listed comprehensively, etc. Thus, the arrangement in FIG. 12 may be understood as illustrative and (at least to some degree) symbolic rather than representing detailed data and/or data structures.

In FIG. 12, an AI based decision support tool 1200 is shown, exhibiting a number of data bodies 1204 through 1230 of at least potentially relevant information. As may be seen, data bodies 1204 through 1230 may include (but are not limited to) a subject's heredity 1204, age 1206, ethnicity 1208, and gender 1210. Data bodies also may include the daily screen time, overall 1212 and daily screen time, close 1214 (e.g., through the use of smart phones, etc., as may typically be viewed at a relatively short distance such as less than an arm's length). Type(s) of near work activity 1216, e.g., other activities as may be performed at close distances (such as reading, certain crafts, use of certain instruments, etc.) also may be considered among data bodies 1204 through 1230.

For an arrangement wherein the AI based decision support tool 1200 is adapted for use regarding ocular conditions, such as progressive myopia, the existence, nature, and/or extent of other ocular conditions 1218 and/or of non-ocular medical conditions 1220 also may be contemplated. The amount of daily time spent indoors 1222 (e.g., where relatively short sight lines and/or artificial lighting may predominate), the amount of daily daylight outdoor time 1224 (e.g., where natural sunlight and/or long sight lines may be common), and type(s) of outdoor activity 1226 (as may relate to what a subject is viewing, at what distance, under what conditions, etc., as well as general health, etc.) may be included. In addition, geographical location 1228 and/or season/time of year 1230 may be considered, e.g., as potentially relating to the strength, duration, and angle of natural daylight, local conditions such as temperature, airborne pollutants, and so forth.

Other factors also may be considered, in addition to or instead of data bodies 1204 through 1230 as shown in FIG. 12, and such data bodies are not limited.

As may be seen, data bodies 1204 through 1230 engage with a database 1202 such as a large learning model database. The large learning model (LLM) database 1202 may in at least some sense be understood as a compilation of information from data bodies 1204 through 1230 but may not necessarily be a simple summation thereof. Rather, the database 1202 may incorporate certain information but not other information, weight information differently, apply estimates of relevance and/or validity, connect and/or correlate information together from multiple fields, etc. In addition, the database 1202 may add, remove, and/or modify information on an ongoing basis, e.g., from peer reviewed medical sources, etc. Thus while a given datum may in some sense be considered static, the database 1202 is not necessarily static (though information is not required to be changed arbitrarily, etc.) but rather may be an evolving, "learning" system that may accommodate new information and improved understanding based on factors such as ongoing scientific research, accumulated data from subject diagnosis and treatment, and so forth.

Still with reference to FIG. 12, the large learning model database 1202 may be seen to be in communication with an artificial intelligence 1240, such as a generative decision support artificial intelligence. The division between an artificial intelligence 1240 and a database 1202 if information may be to at least some degree arbitrary, for example in that the functionality of an artificial intelligence 1240 is at least somewhat defined by the information available thereto (e.g., in a database 1202 engaged therewith), and/or because the contents of the database 1202 may be curated, added to, organized, etc. at least in part by a controlling artificial intelligence 1240 (as may be engaged therewith). However for descriptive purposes at least it may be useful to present the artificial intelligence 1240 and database 1202 as distinct, as shown in FIG. 12.

The artificial intelligence 1240 may be adapted to correlate information available to the database 1202 so as to identify or suggest potentially relevant issues from among a large, multi-dimensional data set. For example, given a problem with (in the arrangement shown with data bodies 1204 through 1230) some 14 different dimensions (though the number and specific classifications of data may vary greatly), rather than requiring a medical professional to evaluate such information "freehand" the artificial intelligence 1240 may highlight potentially relevant correlations within the data, propose promising avenues for diagnosis and/or treatment, etc. It is noted that the artificial intelligence 1240 is not proposed to necessarily exhibit medical expertise as such, nor is it suggested that the artificial intelligence necessarily may substitute for judgment of a trained medical professional; rather, the artificial intelligence may be adapted to provide insight into a complex body of relevant data, so as to support medical diagnosis, treatment, and so forth.

As may also be seen in FIG. 12, three applications 1250, 1260, and 1270 may be seen engaged with the artificial intelligence 1240. In particular, as shown the applications include a regional emphasis approach 1250, a visual fusion approach 1260, and an adaptive break approach 1270. While regional emphasis, visual fusion, and adaptive break approaches 1250, 1260, and 1270 as described herein are not limited only to operation as informed by an artificial intelligence 1240, nor is the artificial intelligence 1240 limited to informing only regional emphasis, visual fusion, and adaptive break approaches 1250, 1260, and 1270, such cooperation is not prohibited and may be fruitful in at least certain instances. Further, it should be understood that the artificial intelligence 1240 may not operate "in a vacuum", e.g., as a purely intellectual or computational phenomenon. Rather, the artificial intelligence 1240 may be used in support of practical methods and/or physical devices for addressing real world concerns, e.g., diagnosis and treatment of subjects exhibiting progressive myopia. Thus, while the regional emphasis, visual fusion, and adaptive break approaches 1250, 1260, and 1270 may not necessarily be part of the AI based decision support tool 1200 as such, the AI based decision support tool 1200 should be understood to be adapted to engage with such real world concerns.

In particular, it is noted that while engagement with regional emphasis, visual fusion, and adaptive break approaches 1250, 1260, and 1270 may be suitable, e.g., for determining effective procedures and parameters for biasing against progressive myopia, an AI based decision support tool 1200 is not limited only to such approaches as may be presented herein. For example, use of atropine may provide at least temporary effects regarding progressive myopia. However, long term effects, dosing, susceptibility to side effects, etc., may be similarly subject to large, complex, multi-dimensional concerns. An AI based decision support tool 1200 may be applied thereto, to determine for example which subjects may benefit from use of atropine, which may expect significant detrimental side effects (either long or short term), what dosage may be suitable, which other alternate approaches may be more effective and/or less likely to produce side effects, etc. Thus, while certain new approaches may be presented herein, integration with and application to existing approaches of new approaches presented herein is not prohibited, and may be fruitful.

The nature of the interface between the AI based decision support tool 1200 and practical utilizations such as regional emphasis, visual fusion, and adaptive break approaches 1250, 1260, and 1270, and/or medical professionals either using such approaches or others, is not limited. A variety of potential interfaces may be suitable, ranging from purely digital systems not readily accessible to human medical experts (e.g., direct communication with a device adapted for a regional emphasis approach) to highly "user friendly" systems approximating a chatbot or similar natural language "question and answer" system. Other approaches also may be suitable.

While not integral to the nature of the AI based decision support tool 1200 itself, it is noted that certain advantages may attach to maintaining such a tool 1200 as a dedicated and/or controlled system. For example, medical information in particular is infamously subject to inconclusive, misleading, or entirely false elements, and training and maintaining a system with limited input and modification access and/or suitable information oversight may be useful in avoiding such inaccuracies. Further, medical information, even if nominally anonymized from personally identifiable links, may be considered sensitive (potentially in both a personal privacy sense and also a legal sense). Creation and management of a dedicated, controlled system may exhibit advantages with regard to data privacy, data and system ownership, performance, system flexibility, cost, transparency, "uptime" operability, latency, content control, bias (also infamous in AI systems, as an AI may be described as being "no smarter than" the data, the programming, the biases—whether overt or unintended—of the persons creating the system, etc.), and/or other factors.

Figure 13:
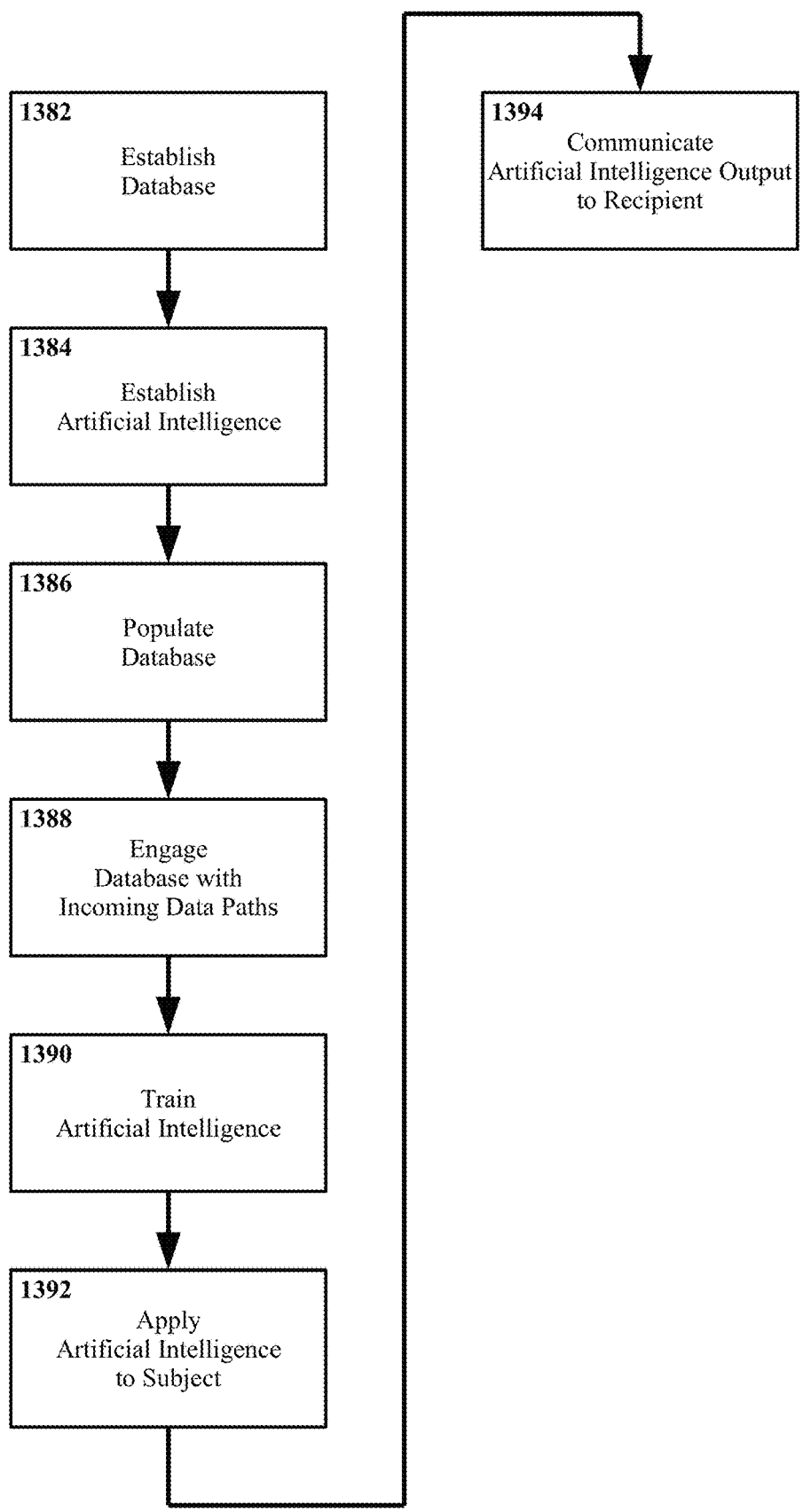
FIG. 13 shows an example method for decision support, in flowchart form.

Now with reference to FIG. 13, therein an example method of utilizing an AI based decision support tool is shown, in flowchart form. In the method as illustrated, a database is established at step 1382. The database may for example be a large learning model database. An artificial intelligence is established at step 1384 in communication with the database. The artificial intelligence may for example be a generative decision support artificial intelligence. The particulars of the artificial intelligence and database are not limited, except insofar as the artificial intelligence and database are adapted to cooperate to provide decision support output with regard to relevant, significant, and/or actionable aspects of therapeutic diagnosis and care (e.g., for eye care, and/or more particularly for biasing against progressive myopia).

Continuing in FIG. 13, the database is populated at step 1386 with initial information as may be obtained from a variety of sources. The database is also engaged with incoming data paths at step 1388, so as to facilitate ongoing addition of new data, removal of obsolete data, and/or modification of data, for example based on developments in the state of the relevant field (such as eye care).

The artificial intelligence is trained at step 1390. Training of artificial intelligence systems generally may be extremely complex and/or varied, and are not presented here. However, in broad terms training typically may (but is not required to) include providing the artificial intelligence with data, determining whether the artificial intelligence can arrive at known or otherwise determinable findings from the data, and modifying the artificial intelligence (and or the database) and/or allowing the artificial intelligence to self-modify to as to improve accuracy until such time as the artificial intelligence demonstrates a reasonable capability to process known data into known findings. Typically, though not necessarily, the artificial intelligence then may be supplied with data so as to determine findings not previously known, and those findings may be verified independently to determine accuracy. However, other arrangements also may be suitable, and are not limited herein.

With the artificial intelligence having been trained to a sufficient degree at step 1390 as to be acceptably functional, and likewise the database populated at step 1386 to sufficient degree (though it is not required that either training (at step 1390) or population (at step 1386) be fully comprehensive or exhaustive; though typically but not necessarily greater artificial intelligence training and/or database population may be desirable, full perfection or completeness may not be obtainable even in principle, and is not required so long as functional capabilities may be achieved), the artificial intelligence is applied at step 1392 to a subject and/or a group of subjects. Output from the artificial intelligence is then communicated to some recipient at step 1394. Output may, as previously noted, include (but is not limited to) relevant, significant, and/or actionable diagnostic, procedural, and/or therapeutic guidance, but is not limited. The recipient to which output is communicated at step 1394 likewise is not limited, though typically (but not necessarily) a recipient may be a medical professional as may make use of the output in diagnoses, treatment, etc., for the subject or group of subjects. Alternately however, output may be communicated to other entities at step 1394, such as a database, research personnel, caregiver, the subject(s) themselves, and recipients are not limited.

Figure 14:
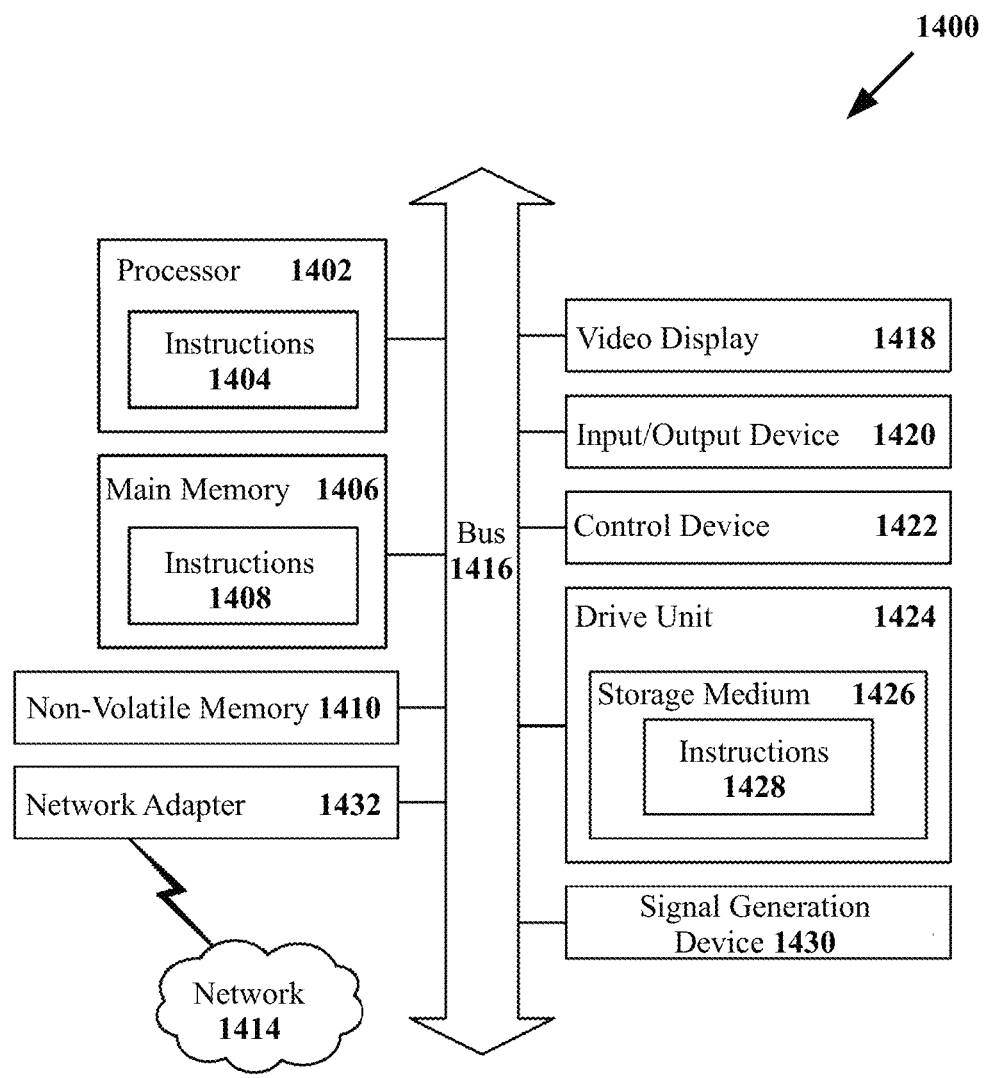
FIG. 14 illustrates an example of a computer network system, in which various embodiments may be implemented, in schematic form.

Moving on to FIG. 14, therein is shown a block diagram illustrating an example of a processing system 1400 in which at least some operations described herein can be implemented. The processing system may include one or more central processing units ("processors") 1402, main memory 1406, non-volatile memory 1410, network adapter 1412 (e.g., network interfaces), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents any one or more separate physical buses, point to point connections, or both connected by appropriate bridges, adapters, or controllers. The bus 1416, therefore, can include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1400 operates as a standalone device, although the processing system 1400 may be connected (e.g., wired or wirelessly) to other machines. In a networked deployment, the processing system 1400 may operate in the capacity of a server or a client machine in a client-server network environment, or as a peer machine in a peer-to-peer (or distributed) network environment.

The processing system 1400 may be a server, a personal computer (PC), a tablet computer, a laptop computer, a personal digital assistant (PDA), a mobile phone, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system.

While the main memory 1406, non-volatile memory 1410, and storage medium 1426 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1428. The term "machine-readable medium" and "storage medium" shall also be taken to include any medium that is capable of storing, encoding, or carrying a set of instructions for execution by the processing system and that cause the processing system to perform any one or more of the methodologies of the presently disclosed embodiments.

Still with reference to FIG. 14, in general the routines executed to implement the embodiments of the disclosure may be implemented as part of an operating system or a specific application, component, program, object, module or sequence of instructions referred to as "computer programs." The computer programs typically comprise one or more instructions (e.g., instructions 1404, 1408, 1428) set at various times in various memory and storage devices in a computer, and that, when read and executed by one or more processing units or processors 1402, cause the processing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1410, floppy and other removable disks, hard disk drives, optical disks (e.g., compact disk read-only memory (CD ROMS), digital versatile disks, (DVDs)), and transmission type media such as digital and analog communication links.

The network adapter 1412 enables the processing system 1400 to mediate data in a network 1414 with an entity that is external to the computing device 1400, through any known and/or convenient communications protocol supported by the processing system 1400 and the external entity. The network adapter 1412 can include one or more of a network adapter card, a wireless network interface card, a router, an access point, a wireless router, a switch, a multi-layer switch, a protocol converter, a gateway, a bridge, bridge router, a hub, a digital media receiver, and/or a repeater.

The network adapter 1412 can include a firewall that can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the computer-implemented systems introduced here can be implemented by hardware (e.g., programmable circuitry such as microprocessors), software, firmware, or a combination of such forms. For example, some computer-implemented systems may be embodied entirely in special-purpose hardwired (i.e., non-programmable) circuitry. Special-purpose circuitry can be in the form of, for example, application-specific integrated circuits (ASICs), programmable logic devices (PLDs), field-programmable gate arrays (FPGAs), etc.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A method for biasing an eye toward a therapeutic outcome, comprising:
   determining a central visual field for said eye of a user;
   determining a peripheral visual field for said eye;

establishing a first visual region for said eye, said first visual region comprising at least a portion of said central visual region;

establishing a second visual region for said eye, said second visual region comprising at least a portion of said peripheral visual region;

establishing a visual emphasis differential between said first and second visual regions;

establishing a first display region for a non-transparent display, said first display region corresponding with said first visual region;

delivering a first display content from said first display region to said first visual region;

establishing a second display region for said non-transparent display, said second display region corresponding with said second visual region;

delivering a second display content from said second display region to said second visual region;

establishing a display emphasis differential between said first and second display regions so as to yield said visual emphasis differential between said first and second visual regions;

applying said display emphasis differential via said non-transparent display to said first display content in said first display region and to said second display content in said second display region; and maintaining, over time, said correspondence of said first and second display regions with said first and second visual regions so as to maintain said visual emphasis differential between said first and second visual regions;

wherein:

said therapeutic outcome comprises at least one of treating myopia, preventing myopia and slowing progression of myopia; and at least one of:
- establishing said central visual field;
- establishing said peripheral visual field;
- establishing said first visual region;
- establishing said second visual region;
- establishing said visual emphasis differential;
- establishing said first display region;
- establishing said second display region;
- establishing said display emphasis differential;
- applying said display emphasis differential; and
- maintaining said correspondence;

comprises, in a processor comprising executable instructions disposed therein, use of an artificial intelligence (AI) decision support tool.

2. The method of claim 1, wherein:
said processor is disposed within an electronic device, said electronic device comprising one of:
- a smart phone display;
- a laptop computer display;
- a computer monitor display;
- a television display; and
- a head mounted display.

3. The method of claim 1, wherein:
said display emphasis differential comprises at least one of:
- altering at least one first image property in at least a portion of said first display region; and
- altering at least one second image property in at least a portion of said second display region.

4. The method of claim 1, wherein:
said display emphasis differential comprises at least one of:
- enhancing at least one first image property in at least a portion of said first display region;
- degrading said at least one first image property in at least said portion of said first display region;
- enhancing said at least one first image property in at least a portion of said second display region; and
- degrading said at least one first image property in at least said portion of said second display region.

5. The method of claim 3, wherein:
each of said at least one first image property and said at least one second image property comprises at least one of:
- a brightness;
- a contrast;
- a saturation;
- a resolution;
- a tint;
- a display refresh rate;
- a video frame rate;
- an animation speed;
- a focus;
- a sharpness; and
- a diffusion.

6. The method of claim 3, wherein:
said at least one first image property and said at least one second image property are like image properties.

7. The method of claim 3, wherein:
said at least one first image property and said at least one second image property are unlike image properties.

8. The method of claim 1, comprising:
varying over time at least one of:
- said first visual region with respect to at least one of said central visual field and said peripheral visual field;
- said second visual region with respect to at least one of said central visual field and said peripheral visual field; and
- said visual emphasis differential.

9. The method of claim 8, comprising:
varying over time at least one of:
- a shape of said first visual region;
- a size of said first visual region;
- a position of said first visual region;
- a shape of said second visual region;
- a size of said second visual region;
- a position of said second visual region; and
- an image property of said visual emphasis differential, said image property comprising at least one of:
  - a brightness;
  - a contrast;
  - a saturation;
  - a resolution;
  - a tint;
  - a display refresh rate;
  - a video frame rate;
  - an animation speed;
  - a focus;
  - a sharpness; and
  - a diffusion.

10. The method of claim 1, comprising:
varying over time at least one of:
- said first display region;
- said second display region; and
- said display emphasis differential.

11. The method of claim 10, comprising:
varying over time at least one of:
- a shape of said first display region;

a size of said first display region;
a position of said first display region;
a shape of said second display region;
a size of said second display region;
a position of said second display region; and
an image property of said display emphasis differential, said image property comprising at least one of:
  a brightness;
  a contrast;
  a saturation;
  a resolution;
  a tint;
  a display refresh rate;
  a video frame rate;
  an animation speed;
  a focus;
  a sharpness; and
  a diffusion.

12. The method of claim 1, wherein:
maintaining said correspondence of said first and second display regions with said first and second visual regions comprises eye tracking.

13. The method of claim 1, wherein:
said first visual region comprises from 0 to 5 degrees from a visual center; and
said second visual region comprises from 5 to 15 degrees from said visual center.

14. The method of claim 1, wherein:
said first visual region defines one of:
  a circle;
  a circular segment;
  a truncated circular segment;
  a rectangle; and
  a square.

15. The method of claim 1, wherein:
said second visual region defines one of:
  a circle;
  a circular segment;
  a truncated circular segment;
  a rectangle; and
  a square.

16. The method of claim 1, wherein:
said first visual region and said second visual region are not contiguous.

17. The method of claim 1, wherein:
at least one of said first visual region and said second visual region comprises at least two subregions not mutually contiguous.

18. An apparatus, comprising:
a non-transparent display;
a visual field monitor; and
a processor, comprising executable instructions instantiated thereon adapted to:
  determine a central visual field for an eye of a user in cooperation with said visual field monitor;
  determine a peripheral visual field for said eye in cooperation with said visual field monitor;
  establish a first visual region for said eye, said first visual region comprising at least a portion of said central visual region;
  establish a second visual region for said eye, said second visual region comprising at least a portion of said peripheral visual region;
  establish a visual emphasis differential between said first and second visual regions;
  establish a first display region for said non-transparent display, said first display region corresponding with said first visual region;
  deliver a first display content from said first display region to said first visual region;
  establish a second display region for said non-transparent display, said second display region corresponding with said second visual region;
  deliver a second display content from said second display region to said second visual region;
  establish a display emphasis differential between said first and second display regions so as to yield said visual emphasis differential between said first and second visual regions;
  apply said display emphasis differential via said non-transparent display to said first display content in said first display region and to said second display content in said second display region; and
  update said non-transparent display so as to maintain over time said correspondence of said first and second display regions with said first and second visual regions so as to maintain said visual emphasis differential between said first and second visual regions;
wherein:
said visual emphasis differential is adapted to bias said eye towards a therapeutic outcome comprising at least one of treating myopia, preventing myopia and slowing progression of myopia; and
at least one of:
  establishing said central visual field;
  establishing said peripheral visual field;
  establishing said first visual region;
  establishing said second visual region;
  establishing said visual emphasis differential;
  establishing said first display region;
  establishing said second display region;
  establishing said display emphasis differential;
  applying said display emphasis differential; and
  maintaining said correspondence;
comprises use of an artificial intelligence (AI) decision support tool.

19. The apparatus of claim 18, wherein:
said visual field monitor comprises a camera adapted to track said eye of said user.

20. The apparatus of claim 18, wherein:
said non-transparent display comprises one of:
  a smart phone display;
  a laptop computer display;
  a computer monitor display;
  a television display; and
  a head mounted display.

21. The apparatus of claim 18, wherein:
said non-transparent display comprises one of:
  a mono display; and
  a stereo display.

22. An apparatus, comprising:
non-transparent display means for displaying visual content;
means for monitoring a visual field of an eye of a user;
means for processing executable instructions, comprising an artificial intelligence (AI) decision support tool, and adapted to:
  determine a central visual field for an eye of a user in cooperation with said visual field monitor;
  determine a peripheral visual field for said eye in cooperation with said visual field monitor;

establish a first visual region for said eye, said first visual region comprising at least a portion of said central visual region;

establish a second visual region for said eye, said second visual region comprising at least a portion of said peripheral visual region;

establish a visual emphasis differential between said first and second visual regions;

establish a first display region for said non-transparent display means, said first display region corresponding with said first visual region;

deliver a first display content from said first display region to said first visual region;

establish a second display region for said non-transparent display means, said second display region corresponding with said second visual region;

deliver a second display content from said second display region to said second visual region;

establish a display emphasis differential between said first and second display regions so as to yield said visual emphasis differential between said first and second visual regions;

apply said display emphasis differential via said non-transparent display means to said first display content in said first display region and to said second display content in said second display region; and update said non-transparent display means so as to maintain over time said correspondence of said first and second display regions with said first and second visual regions so as to maintain said visual emphasis differential between said first and second visual regions;

wherein:

said visual emphasis differential is adapted to bias said eye towards a therapeutic outcome comprising at least one of treating myopia, preventing myopia and slowing progression of myopia.

\* \* \* \* \*